United States Patent
Son et al.

(10) Patent No.: US 11,756,575 B2
(45) Date of Patent: Sep. 12, 2023

(54) ELECTRONIC DEVICE AND METHOD FOR SPEECH RECOGNITION PROCESSING OF ELECTRONIC DEVICE

(71) Applicant: Samsung Electronics Co., Ltd., Gyeonggi-do (KR)

(72) Inventors: Jisu Son, Gyeonggi-do (KR); Youngbin Kim, Gyeonggi-do (KR); Jungkeun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/677,149

(22) Filed: Feb. 22, 2022

(65) Prior Publication Data

US 2022/0262391 A1    Aug. 18, 2022

Related U.S. Application Data

(63) Continuation of application No. PCT/KR2022/002213, filed on Feb. 15, 2022.

(30) Foreign Application Priority Data

Feb. 16, 2021    (KR) .......................... 10-2021-0020454

(51) Int. Cl.
   *G10L 25/78*    (2013.01)
   *G10L 15/00*    (2013.01)
   *H04L 67/12*    (2022.01)

(52) U.S. Cl.
   CPC .............. *G10L 25/78* (2013.01); *G10L 15/00* (2013.01); *H04L 67/12* (2013.01)

(58) Field of Classification Search
   CPC ......... G10L 25/78; G10L 17/00; G10L 15/00; G10L 15/1822; G10L 15/18; G10L 15/08;
   (Continued)

(56) References Cited

U.S. PATENT DOCUMENTS 6,415,257 B1 *   7/2002   Junqua ............. H04N 21/42203
                                                                704/275
9,953,648 B2     4/2018   Choi et al.
(Continued)

FOREIGN PATENT DOCUMENTS

KR    10-2013-0141241 A    12/2013
KR    10-2014-0067191 A     6/2014
(Continued)

OTHER PUBLICATIONS

Written Opinion dated May 10, 2022.
International Search Report dated May 10, 2022.

*Primary Examiner* — Huyen X Vo
(74) *Attorney, Agent, or Firm* — Cha & Reiter, LLC

(57) ABSTRACT

An electronic device and method are disclosed. The device includes a memory and speech recognition circuitry and/or a processor, which implements the method, including: receiving a first utterance, and processing the first utterance to initiate a session and generate a first response result, after the session related to the first utterance is terminated, receiving a second utterance, processing the second utterance to generate a second response result, based on the second response result, determining whether to execute follow-up utterance processing on the second utterance as if the session were active, based on determining to execute the follow-up utterance processing, reprocessing the second utterance based at least in part on the first response result related to the first utterance to generate a third response result, and outputting the third response result.

15 Claims, 20 Drawing Sheets

(58) Field of Classification Search
CPC .......... G10L 15/26; H04L 67/12; G06F 40/35;
G06F 40/30
See application file for complete search history.

(56) References Cited

U.S. PATENT DOCUMENTS

| | | |
|---|---|---|
| 10,181,322 B2 | 1/2019 | Hakkani-Tur et al. |
| 2013/0339032 A1 | 12/2013 | Yoon et al. |
| 2014/0120987 A1 | 5/2014 | Kim et al. |
| 2015/0340033 A1 | 11/2015 | Di Fabbrizio et al. |
| 2018/0144055 A1 | 5/2018 | Wu |
| 2019/0130907 A1 | 5/2019 | Joh |
| 2020/0043476 A1 | 2/2020 | Hwang |
| 2020/0051554 A1 | 2/2020 | Kim et al. |
| 2020/0143809 A1 | 5/2020 | Lee et al. |
| 2021/0097990 A1 | 4/2021 | Kim et al. |
| 2021/0295822 A1* | 9/2021 | Tomkins ........... G06F 16/90332 |

FOREIGN PATENT DOCUMENTS

| | | |
|---|---|---|
| KR | 10-1724748 B1 | 4/2017 |
| KR | 10-2018-0084392 A | 7/2018 |
| KR | 10-2018-0096483 A | 8/2018 |
| KR | 10-2019-0049260 A | 5/2019 |
| KR | 10-2019-0118996 A | 10/2019 |
| KR | 10-2020-0050373 A | 5/2020 |

* cited by examiner

ELECTRONIC DEVICE AND METHOD FOR SPEECH RECOGNITION PROCESSING OF ELECTRONIC DEVICE

CROSS-REFERENCE TO RELATED APPLICATION(S)

This application is a continuation of International Application No. PCT/KR2022/002213, filed on Feb. 15, 2022, which claims priority to Korean Patent Application No. 10-2021-0020454, filed on Feb. 16, 2021 in the Korean Intellectual Property Office, the disclosures of which are herein incorporated by reference.

TECHNICAL FIELD

An embodiment of the disclosure provides an electronic device capable of receiving a speech input, and, more particularly, to receiving speech commands and executing a corresponding function.

BACKGROUND

With the development of digital technology, there has been a proliferation in electronic devices, such as personal digital assistants (PDA), smartphones, tablet personal computers (PC), artificial intelligence (AI) assisted speakers, wearable smart devices, digital cameras, and/or an Internet of Things (IoT) device. In order to support and increase the availability and range of executable functions on such electronic devices, hardware and/or software components for these electronic devices are seeing continued development.

Such devices may now perform many functions beyond the typical call function, and furthermore, these devices may provide user interfaces in a variety of formats, which facilitate usage of the various functions provided therein. For example, an input interface of an electronic device may include a speech input scheme, in addition to a button input scheme or a touch screen-based touch input scheme. For example, an electronic device may control execution of an application according to a user speech command using a speech recognition (or voice recognition) technology, or execute a function using a web-based service. The speech recognition technology may allow natural understanding of speech uttered by a user (e.g., person), which may then be converted into code information that an electronic device can parse and process. For example, speech recognition technology may include receiving an input of a speech waveform, identifying a word or a sequence of words included therein, and extracting a meaning through which a requested function may be derived or inferred.

Current speech recognition technology may utilize local processing of a command when a simple computational process is involved, and external processing via a server (e.g., intelligent server), when a complex computational process and/or usage of a significant quantity of computing resources is involved, which the local electronic device (e.g., client) is accordingly unable to process. For example, an electronic device may acquire a user command (e.g., input speech), and may transfer the acquired user command to a server for external processing.

An electronic device may process a user's utterance via an intelligent service (e.g., AI speech assistant) (or artificial intelligence assistant or intelligent personal assistant service), and may process a follow-up utterance. The processing of utterances and follow-up utterances may be executed continuously via maintenance of a communication session (e.g., connection or maintenance time for service) between the electronic device and a server. For example, while the session between the electronic device and the server is maintained, a corresponding response may be provided to a user by continuously processing (e.g., follow-up utterance processing) the sequence of user utterances based on a capsule (or domain) derived via processing of a previous utterance in the sequence.

Typically, a follow-up utterance is supported when a session between the electronic device and the server is maintained. However, when a follow-up utterance is received after a session including a previous utterance is terminated, the processing of the follow-up utterance may not be supported. Accordingly, the utterance will be recognized and processed as a new initial utterance (e.g., root utterance) of a new session, rather than as a follow-up utterance as intended, causing user inconvenience.

SUMMARY

Certain embodiments disclose a method and a device, in which, when an electronic device provides an intelligent service (e.g., AI speech assistant), a support range of a follow-up utterance may be extended after session termination, so that an utterance received subsequent to the session termination may be processed as a follow-up utterance.

Certain embodiments disclose a method and a device, in which after an electronic device provides a response result of a first utterance, and after a session related to the first utterance is terminated, and a second utterance input after the session termination may nonetheless be processed as a follow-up utterance subsequent to the first utterance.

Certain embodiments disclose a method and a device, in which, if a server fails to process a second utterance input after termination of a session related to a first utterance, or if a capsule (or domain), which is obtained in the server by processing the second utterance input after termination of the session, is different from a capsule (or domain) obtained by processing the previous first utterance, the second utterance may be nonetheless processed as a follow-up utterance subsequent to the first utterance based on the capsule obtained by processing the first utterance.

Certain embodiments disclose a method and a device in which, in a state where a session is terminated, when a response to a subsequently input utterance is provided, either a first response result obtained according to follow-up utterance processing or both a second response result obtained according to root utterance processing and the first response result may be selectively provided with respect to the corresponding utterance.

A device for supporting a speech recognition service according to an embodiment of the disclosure may include memory, and a speech recognition device (or circuitry, or a processor) operatively connected to the memory, configured to receive a first utterance, and process the first utterance to initiate a session and generate a first response result, after the session related to the first utterance is terminated, receive a second utterance, process the second utterance to generate a second response result, based on the second response result, determine whether to execute follow-up utterance processing on the second utterance, based on determining to execute the follow-up utterance processing, reprocess the second utterance based at least in part on the first response result related to the first utterance to generate a third response result, and output the third response result.

An electronic device according to an embodiment of the disclosure may include communication circuitry, a display, a microphone, memory, and at least one processor, configured to: receive a first utterance via the microphone, and process the first utterance to initial a session and generate a first response result, after terminating the session related to the first utterance, receive a second utterance via the microphone, process the second utterance to generate a second response result, based on the second response result, determine whether to execute follow-up utterance processing on the second utterance, based on determine to execute the follow-up utterance processing, reprocess the second utterance based at least in part on the first response result related to the first utterance to generate a third response result, and output the third response result.

An operation method of an electronic device according to an embodiment of the disclosure may include receiving via a microphone a first utterance, and processing via at least one processor the first utterance to initiate a session and generate a first response result, after the session related to the first utterance is terminated, receiving a second utterance via the microphone, processing the second utterance to generate a second response result, based on the second response result, determining whether to execute follow-up utterance processing on the second utterance, based on determining to execute the follow-up utterance processing, reprocessing the second utterance based at least in part on the first response result related to the first utterance to generate a third response result, and outputting via output circuitry the third response result.

In order to provide the above-indicated implementations, certain embodiments of the disclosure may include a computer-readable recording medium in which a program for executing the method in a processor is recorded.

The further scope of applicability for the disclosure will become apparent from the following detailed descriptions. However, various changes and modifications within the scope of the disclosure may be clearly understood by those skilled in the art, and it should be thus understood that the detailed descriptions and specific embodiments, such as preferred embodiments of the disclosure, are given by way of example only.

According to an electronic device and an operating method thereof according to an embodiment of the disclosure, after an electronic device provides a response result of a first utterance, and after a session related to the first utterance is terminated, a second utterance input after the termination of the session may still be processed as a follow-up utterance subsequent to the first utterance. According to certain embodiments, when an electronic device provides an intelligent service (e.g., AI speech assistant), a user's convenience, accessibility, and/or satisfaction of service use can be improved by extending a support range of a follow-up utterances even after the termination of the relevant session.

According to an embodiment of the disclosure, when a session is terminated, when a response to a subsequently input utterance is received, a first response result can be generated according to follow-up utterance processing. In another embodiment, both the first response result and a second response result may be generated according to root utterance processing with respect to the corresponding utterance, thereby improving a user's convenience, accessibility, and/or satisfaction of service use.

In addition, various effects directly or indirectly identified via the document can be provided.

BRIEF DESCRIPTION OF DRAWINGS

In relation to the description of the drawings, the same or similar reference numerals may be used for the same or similar elements.

DETAILED DESCRIPTION

Figure 1:
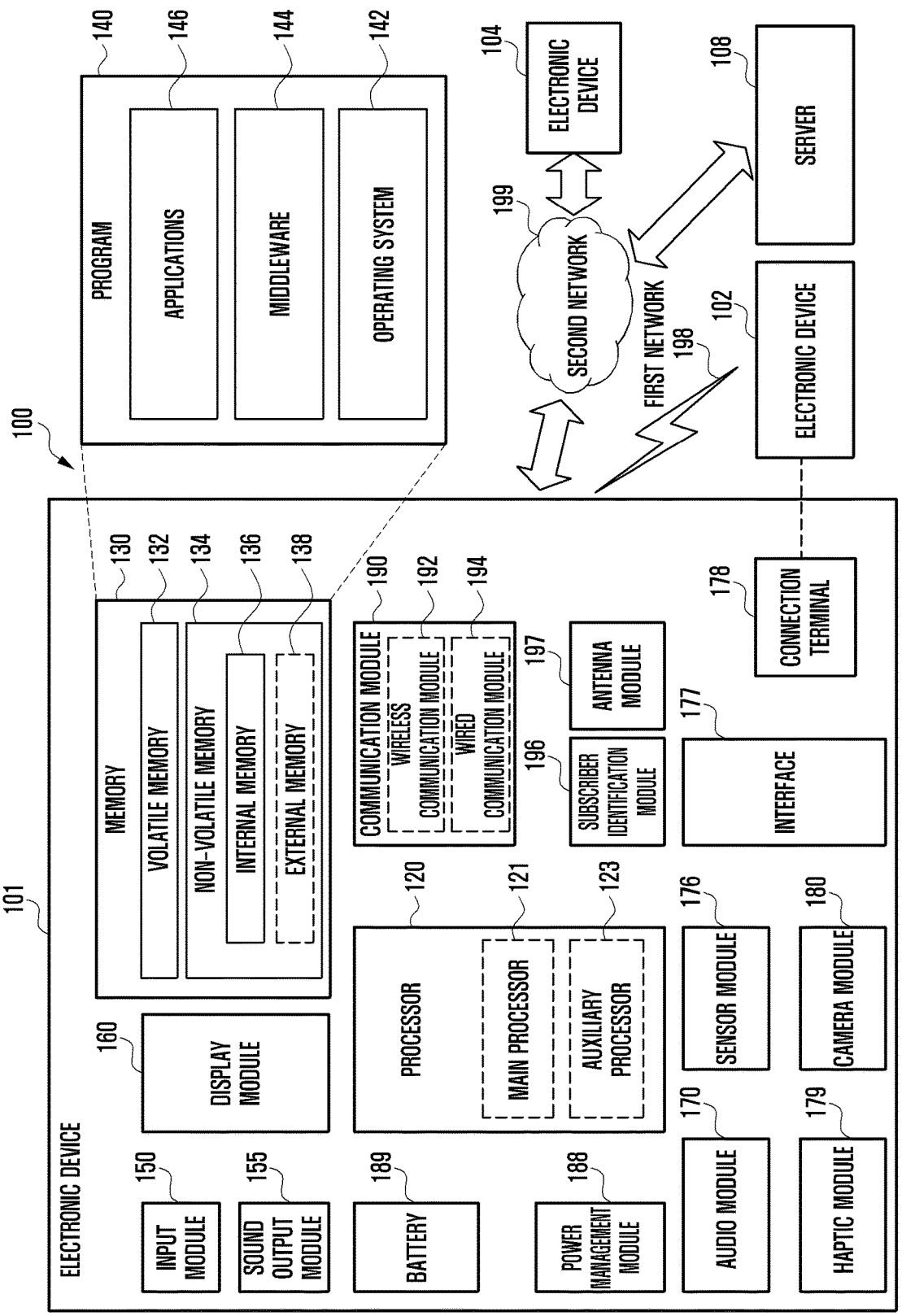
FIG. 1 is a block diagram illustrating an example electronic device in a network environment according to certain embodiments.

FIG. 1 is a block diagram illustrating an example electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In certain embodiments, at least one of the components (e.g., the connecting terminal 178) may be omitted from the electronic device 101, or one or more other components may be added in the electronic device 101. In certain embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with certain embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
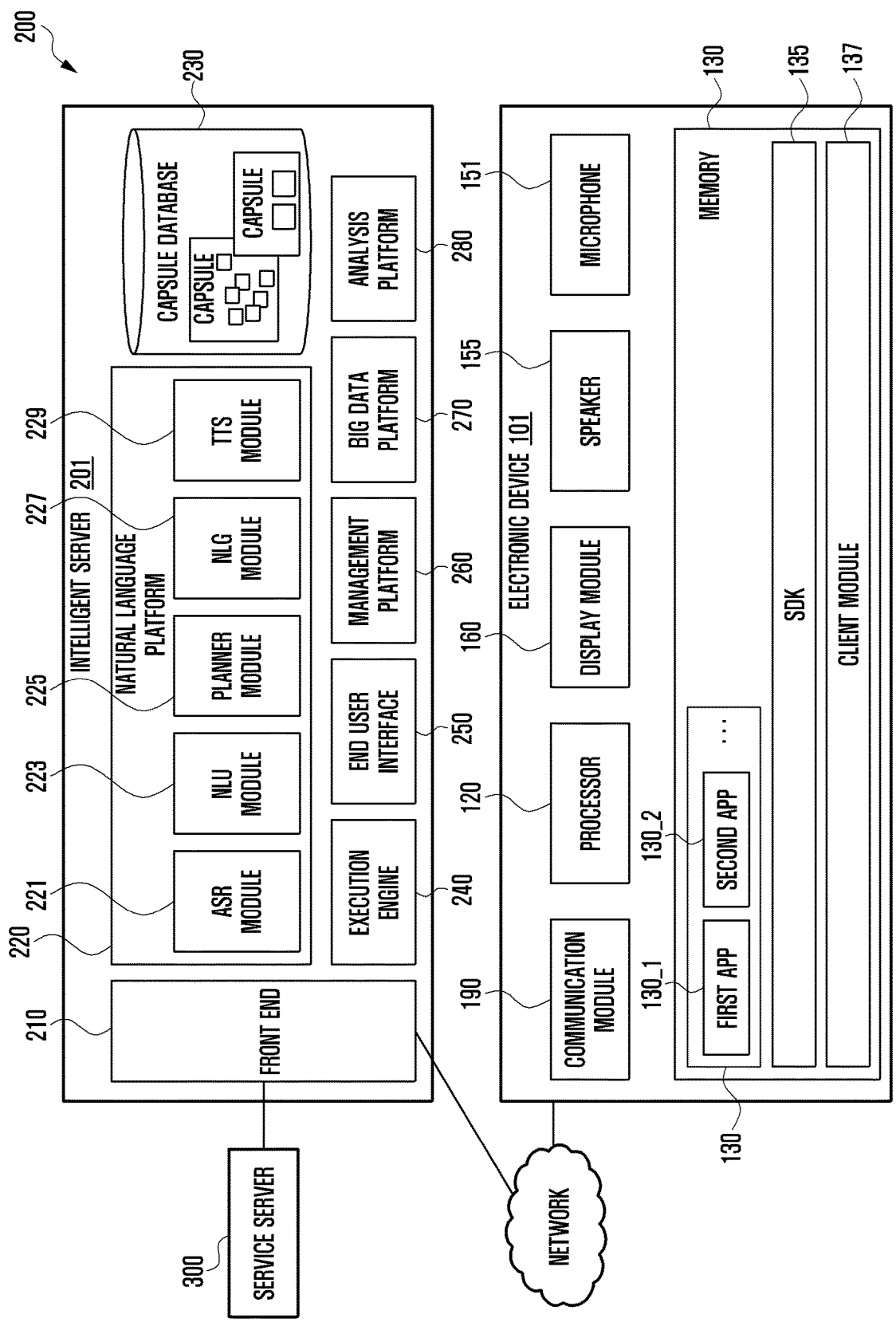
FIG. 2 is a block diagram illustrating an example integrated intelligence system according to certain embodiments.

FIG. 2 is a block diagram illustrating an example integrated intelligence system according to certain embodiments.

Referring to FIG. 2, the integrated intelligence system 200 according to the embodiment may include an electronic device 101, an intelligent server 201, and/or a service server 300.

The electronic device 101 of an embodiment may be a terminal device (or electronic device) that can be connected to the Internet, for example, a mobile phone, a smartphone, a personal digital assistant (PDA), a notebook computer, a TV, a domestic appliance, a wearable device, a head-mounted display (HMD), or a smart speaker.

According to the illustrated embodiment, the electronic device 101 may include a communication module (e.g., including communication circuitry) 190 (e.g., the wireless communication module 192 of FIG. 1), a microphone 151 (e.g., the input module 150 of FIG. 1), a speaker 155 (e.g., the sound output module 155 of FIG. 1), a display module 160, a memory 130, and/or a processor (e.g., including communication circuitry) 120. The listed components may be operatively or electrically connected to each other.

The communication module 190 according to an embodiment may include various communication circuitry and may be configured to be connected to an external device to transmit and receive data. The microphone 151 according to an embodiment may receive a sound (e.g., a user utterance) and may convert the sound into an electrical signal. The speaker 155 according to an embodiment may output an electrical signal as a sound (e.g., a voice). The display module 160 according to an embodiment may be configured to display an image or a video. Further, the display module 160 according to an embodiment may display a graphic user interface (GUI) of an executed application (or application program).

The memory 130 according to an embodiment may store a client module 137, a software development kit (SDK) 135, and a plurality of applications 133. The client module 137 and the SDK 135 may form a framework (or a solution program) for performing a general-purpose function. In addition, the client module 137 or the SDK 135 may form a framework for processing a voice input.

The plurality of applications 133 stored in the memory 130 according to an embodiment may be programs for performing a designated function. According to an embodiment, the plurality of applications 133 may include a first application 130_1 and a second application 130_2. According to an embodiment, each of the plurality of applications 133 may include a plurality of operations for performing a designated function. For example, the applications 133 may include an alarm application, a message application, and/or a schedule application. According to an embodiment, the plurality of applications 133 may be executed by the processor 120 to sequentially execute at least some of the plurality of operations.

The processor 120 according to an embodiment may include various processing circuitry and control the overall operation of the electronic device 101. For example, the processor 120 may be operatively or electrically connected to the communication module 190, the microphone 151, the speaker 155, and the display module 160 to perform a designated operation.

The processor 120 according to an embodiment may execute a program stored in the memory 130 to perform a designated function. For example, the processor 120 may execute at least one of the client module 137 or the SDK 135 to perform the following operation for processing a voice input. The processor 120 may control the operation of the plurality of applications 133, for example, through the SDK 135. An operation to be described below as the operation of the client module 137 or the SDK 135 may be an operation executed by the processor 120.

The client module 137 according to an embodiment may receive a voice input. For example, the client module 137 may receive a voice signal corresponding to a user utterance detected through the microphone 151. The client module 137 may transmit the received voice input to the intelligent server 201. The client module 137 may transmit state information about the electronic device 101, together with the received voice input, to the intelligent server 201. The state information may be, for example, execution state information about an application.

The client module 137 according to an embodiment may receive a result corresponding to the received voice input from the intelligent server 201. For example, when the intelligent server 201 can produce the result corresponding to the received voice input, the client module 137 may receive the result corresponding to the received voice input from the intelligent server 201. The client module 137 may display the result received from the intelligent server 201 on the display module 160.

The client module 137 according to an embodiment may receive a plan corresponding to the received voice input from the intelligent server 201. The client module 137 may display a result of executing a plurality of operations of at least one application according to the plan on the display module 160. For example, the client module 137 may sequentially display results of executing the plurality of operations on the display module 160. In another example, the client module 137 may display only some (e.g., a result of executing the last operation) of the results of executing the plurality of operations on the display module 160.

According to an embodiment, the client module 137 may receive a request for obtaining information required to produce the result corresponding to the voice input from the intelligent server 201. According to an embodiment, the client module 137 may transmit the required information to the intelligent server 201 in response to the request.

The client module 137 according to an embodiment may transmit information about the result of executing the plurality of operations according to the plan to the intelligent server 201. The intelligent server 201 may identify that the received voice input has been properly processed using the information about the result.

The client module 137 according to an embodiment may include a speech recognition module. According to an embodiment, the client module 137 may recognize a voice input for performing a limited function through the speech recognition module. For example, the client module 137 may perform an intelligent application for processing a voice input through a designated input (e.g., Wake up!).

The intelligent server 201 according to an embodiment may receive information relating to a user voice input from the electronic device 101 through a communication network. According to an embodiment, the intelligent server 201 may change data relating to the received voice input into text data. According to an embodiment, the intelligent server 201 may generate, based on the text data, a plan for performing a task corresponding to the user voice input.

According to an embodiment, the plan may be generated by an artificial intelligence (AI) system. The artificial intelligence system may include a rule-based system or a neural network-based system (e.g., a feedforward neural network (FNN)), or a recurrent neural network (RNN). The artificial intelligence system may be a combination of the above systems or a different artificial intelligence system. According to an embodiment, the plan may be selected from a set of predefined plans, or may be generated in real time in response to a user request. For example, the artificial intelligence system may select at least one plan from among a plurality of predefined plans.

The intelligent server 201 according to an embodiment may transmit a result according to the generated plan to the electronic device 101 or may transmit the generated plan to the electronic device 101. According to an embodiment, the electronic device 101 may display the result according to the plan on the display module 160. According to an embodiment, the electronic device 101 may display a result of executing an operation according to the plan on the display module 160.

The intelligent server 201 according to an embodiment may include a front end 210, a natural language platform 220, a capsule DB 230, an execution engine 240, an end user interface 250, a management platform 260, a big data platform 270, and/or an analytic platform 280.

The front end 210 according to an embodiment may receive a voice input received from the electronic device 101. The front end 210 may transmit a response corresponding to the voice input to the electronic device 101.

According to an embodiment, the natural language platform 220 may include an automatic speech recognition module (ASR module) 221, a natural language understanding module (NLU module) 223, a planner module 225, a natural language generator module (NLG module) 227, and/or a text-to-speech (TTS) module 229, each of which may include various processing circuitry and/or executable program instructions.

The ASR module 221 according to an embodiment may convert a voice input received from the electronic device 101 into text data. The NLU module 223 according to an embodiment may understand a user's intent using the text data of the voice input. For example, the NLU module 223 may understand the user's intent by performing a syntactic analysis and/or a semantic analysis. The NLU module 223 according to an embodiment may understand the meaning of a word extracted from the voice input using a linguistic feature (e.g., a syntactic element) of a morpheme or phrase and may determine the user's intent by matching the understood meaning of the word to intent.

The planner module 225 according to an embodiment may generate a plan using the intent determined by the NLU module 223 and a parameter. According to an embodiment, the planner module 225 may determine a plurality of domains utilized to perform a task based on the determined intent. The planner module 225 may determine a plurality of operations respectively included in the plurality of domains determined based on the intent. According to an embodiment, the planner module 225 may determine a parameter required to execute the plurality of determined operations or a result value output by executing the plurality of operations. The parameter and the result value may be defined as a concept in a designated format (or class). Accordingly, the plan may include the plurality of operations determined by the intent of the user and a plurality of concepts. The planner module 225 according to an embodiment may determine a relationship between the plurality of operations and the plurality of concepts by stages (or hierarchically). For example, the planner module 225 may determine the execution order of the plurality of operations, determined based on the user's intent, based on the plurality of concepts. That is, the planner module 225 may determine the execution order of the plurality of operations, based on the parameter required to execute the plurality of operations and the result output by executing the plurality of operations. Accordingly, the planner module 225 may generate a plan including association information (e.g., ontology) between the plurality of operations and the plurality of concepts. The planner module 225 may generate a plan using information stored in a capsule database 230 in which a set of relationships between concepts and operations is stored.

The NLG module 227 according to an embodiment may change designated information into a text form. The information changed into the text form may be in the form of a natural language utterance. The TTS module 229 according to an embodiment may change information in the text form into information in a voice form.

According to an embodiment, some or all functions of the natural language platform 220 may also be implemented in the electronic device 101.

The capsule database 230 according to an embodiment may store information about a relationship between a plurality of concepts and a plurality of operations corresponding to a plurality of domains. A capsule according to an embodiment may include a plurality of action objects (or pieces of action information) and a plurality of concept objects (or pieces concept information) included in a plan. According to an embodiment, the capsule database 230 may store a plurality of capsules in the form of a concept action network (CAN). According to an embodiment, the plurality of capsules may be stored in a function registry included in the capsule database 230.

According to an embodiment, the capsule database 230 may include a strategy registry that stores strategy information required to determine a plan corresponding to a voice input. The strategy information may include reference information for determining one plan when there is a plurality of plans corresponding to the voice input. According to an embodiment, the capsule database 230 may include a follow-up registry that stores information about a follow-up action for suggesting a follow-up action to the user in a specified situation. The follow-up may include, for example, a following utterance. According to an embodiment, the capsule database 230 may include a layout registry that stores layout information about information output through the electronic device 101.

According to an embodiment, the capsule database 230 may include a vocabulary registry that stores vocabulary information included in capsule information. According to an embodiment, the capsule database 230 may include a dialog registry that stores information about a dialog (or interaction) with the user. The capsule database 230 may update a stored object through a developer tool. The developer tool may include, for example, a function editor for updating an action object or a concept object. The developer tool may include a vocabulary editor for updating vocabulary.

The developer tool may include a strategy editor for generating and registering a strategy for determining a plan. The developer tool may include a dialog editor that generates a dialog with the user. The developer tool may include a follow-up editor capable of activating a following target and editing a following utterance providing a hint. The following target may be determined based on a currently set target, user preference, or an environmental condition. In an embodiment, the capsule database 230 can also be implemented in the electronic device 101.

The execution engine 240 according to an embodiment may produce a result using the generated plan. The end user interface 250 according to an embodiment may transmit the produced result to the electronic device 101. Accordingly, the electronic device 101 may receive the result and may provide the received result to the user. The management platform 260 according to an embodiment may manage information used in the intelligent server 201. The big data platform 270 according to an embodiment may collect user data. The analytic platform 280 according to an embodiment may manage the quality of service (QoS) of the intelligent server 201. For example, the analytic platform 280 may manage a component and the processing speed (or efficiency) of the intelligent server 201.

The service server 300 according to an embodiment may provide a designated service (e.g., a food delivery service or a hotel reservation service) to the electronic device 101. According to an embodiment, the service server 300 may be a server operated by a third party. The service server 300 according to an embodiment may provide information for generating a plan corresponding to a received voice input to the intelligent server 201. The provided information may be stored in the capsule database 230. In addition, the service server 300 may provide result information according to the plan to the intelligent server 201.

In the foregoing integrated intelligent system 200, the electronic device 101 may provide various intelligent services to the user in response to a user input. The user input may include, for example, an input through a physical button, a touch input, or a voice input.

In an embodiment, the electronic device 101 may provide a voice recognition service through an intelligent application (or voice recognition application) stored therein. In this case, for example, the electronic device 101 may recognize a user utterance or a voice input received through the microphone 151 and may provide a service corresponding to the recognized voice input to the user.

In an embodiment, the electronic device 101 may perform a designated operation alone or together with the intelligent server 201 and/or the service server 300, based on the received voice input. For example, the electronic device 101 may execute an application corresponding to the received voice input and may perform the designated operation through the executed application.

In an embodiment, when the electronic device 101 provides a service together with the intelligent server 201 and/or the service server 300, the electronic device 101 may detect a user utterance using the microphone 151 and may generate a signal (or voice data) corresponding to the detected user utterance. The electronic device 101 may transmit the voice data to the intelligent server 201 using the communication module 190.

The intelligent server 201 according to an embodiment may generate, as a voice input received from the electronic device 101, a plan for performing a task corresponding to the voice input or a result of performing an operation according to the plan. The plan may include, for example, a plurality of operations for performing the task corresponding to the user's voice input and a plurality of concepts related to the plurality of operations. The concepts may define a parameter input to execute the plurality of operations or a result value output by executing the plurality of operations. The plan may include information about an association between the plurality of operations and the plurality of concepts.

The electronic device 101 according to an embodiment may receive the response using the communication module 190. The electronic device 101 may output an audio signal generated inside the electronic device 101 to the outside using the speaker 155 or may output an image generated inside the electronic device 101 to the outside using the display module 160.

Although FIG. 2 illustrates an example in which speech recognition of a voice input received from the electronic device 101, natural language understanding and generation, and production of a result using a plan are performed in the intelligent server 201, certain embodiments of the disclosure are not limited thereto. For example, at least some components (e.g., the natural language platform 220, the execution engine 240, and the capsule database 230) of the intelligent server 201 may be embedded in the electronic device 101, and operations thereof may be performed by the electronic device 101.

Figure 3:
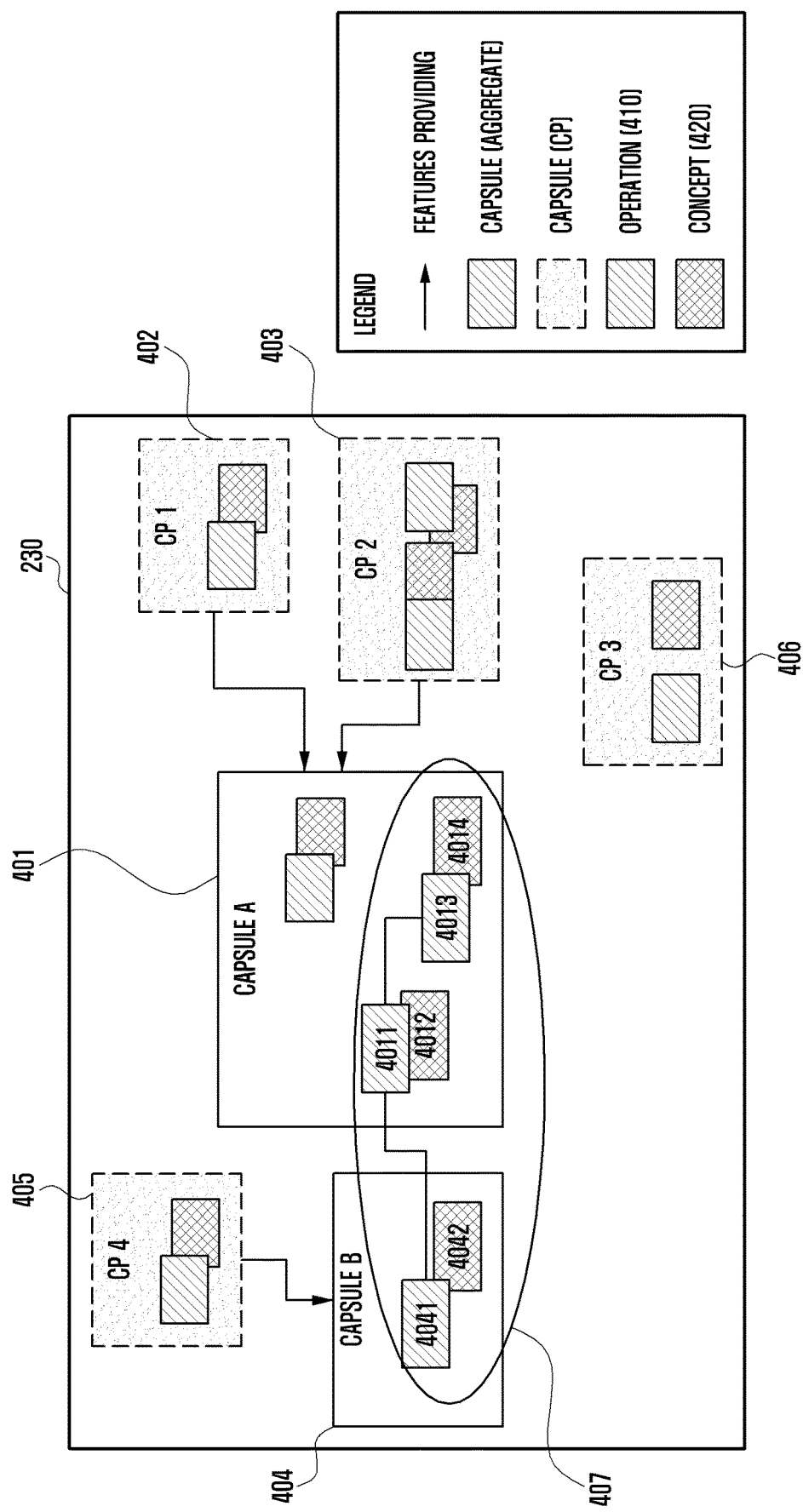
FIG. 3 is a diagram illustrating an example form in which information about a relationship between a concept and an action is stored in a database according to certain embodiments.

FIG. 3 is a diagram illustrating an example form in which information about a relationship between a concept and an operation is stored in a database according to certain embodiments.

A capsule database 230 of an intelligent server 201 may store a capsule in the form of a concept action network (CAN). The capsule database 230 may store an operation of processing a task corresponding to a voice input from a user and a parameter required for the operation in the form of a CAN.

The capsule database 230 may store a plurality of capsules (e.g., capsule A 401 and capsule B 404) respectively corresponding to a plurality of domains (e.g., applications). According to an embodiment, one capsule (e.g., capsule A 401) may correspond to one domain (e.g., location (geo) or application). Further, one capsule may correspond to at least one service provider (e.g., CP 1 401, CP 2 403, CP 3 406, or CP 4 405) for performing a function for a domain related to the capsule. According to an embodiment, one capsule may include at least one operation 410 and at least one concept 420 for performing a specified function.

A natural language platform 220 may generate a plan for performing a task corresponding to a received voice input using a capsule stored in the capsule database 230. For example, a planner module 225 of the natural language platform 220 may generate the plan using the capsule stored in the capsule database 230. For example, the plan 407 may be generated using operations 4011 and 4013 and concepts 4012 and 4014 of capsule A 401 and an operation 4041 and a concept 4042 of capsule B 404.

Figure 4:
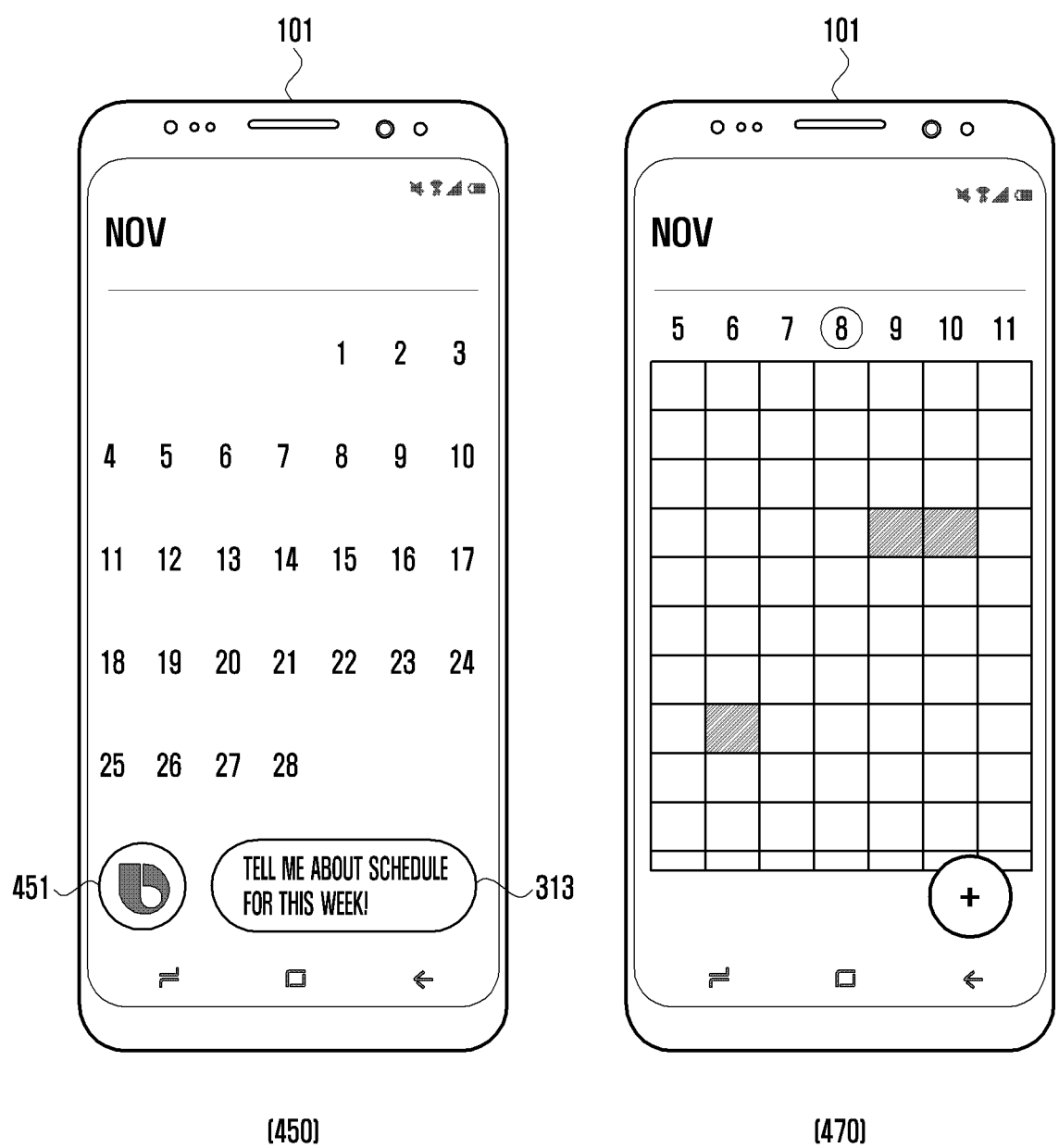
FIG. 4 is a diagram illustrating an example of a user interface for an electronic device to process a received voice input through an intelligent application according to certain embodiments.

FIG. 4 is a diagram illustrating an example of a user interface for an electronic device to process a received voice input through an intelligent application according to certain embodiments.

According to an embodiment, an electronic device 101 may execute an intelligent application to process a user command (e.g., a voice input) through an intelligent server 201.

According to an embodiment, when recognizing a designated voice input (e.g., Wake up!) or receiving an input via a hardware key (e.g., a dedicated hardware key), the electronic device 101 may execute the intelligent application for processing the voice input in a first user interface 450. For example, the electronic device 101 may execute the intelligent application in a state in which a schedule application is executed. According to an embodiment, the electronic device 101 may display an object 451 (e.g., an icon) corresponding to the intelligent application on a display module 160. According to an embodiment, the electronic device 101 may receive a voice input based on a user utterance. For example, the electronic device 101 may receive a voice input "Tell me the schedule for this week!" According to an embodiment, the electronic device 101 may display a user interface (UI, e.g., an input window) 313 of the intelligent application displaying text data of the received voice input on the display module 160.

According to an embodiment, the electronic device 101 may display a result corresponding to the received voice input in a second user interface 470 on the display module 160. For example, the electronic device 101 may receive a plan corresponding to the received user command (e.g., the received voice input) and may display "Schedule for this week" according to the plan on the display module 160.

Before describing certain embodiments, an electronic device 101 to which an embodiment of the disclosure is applicable will be described.

Figure 5:
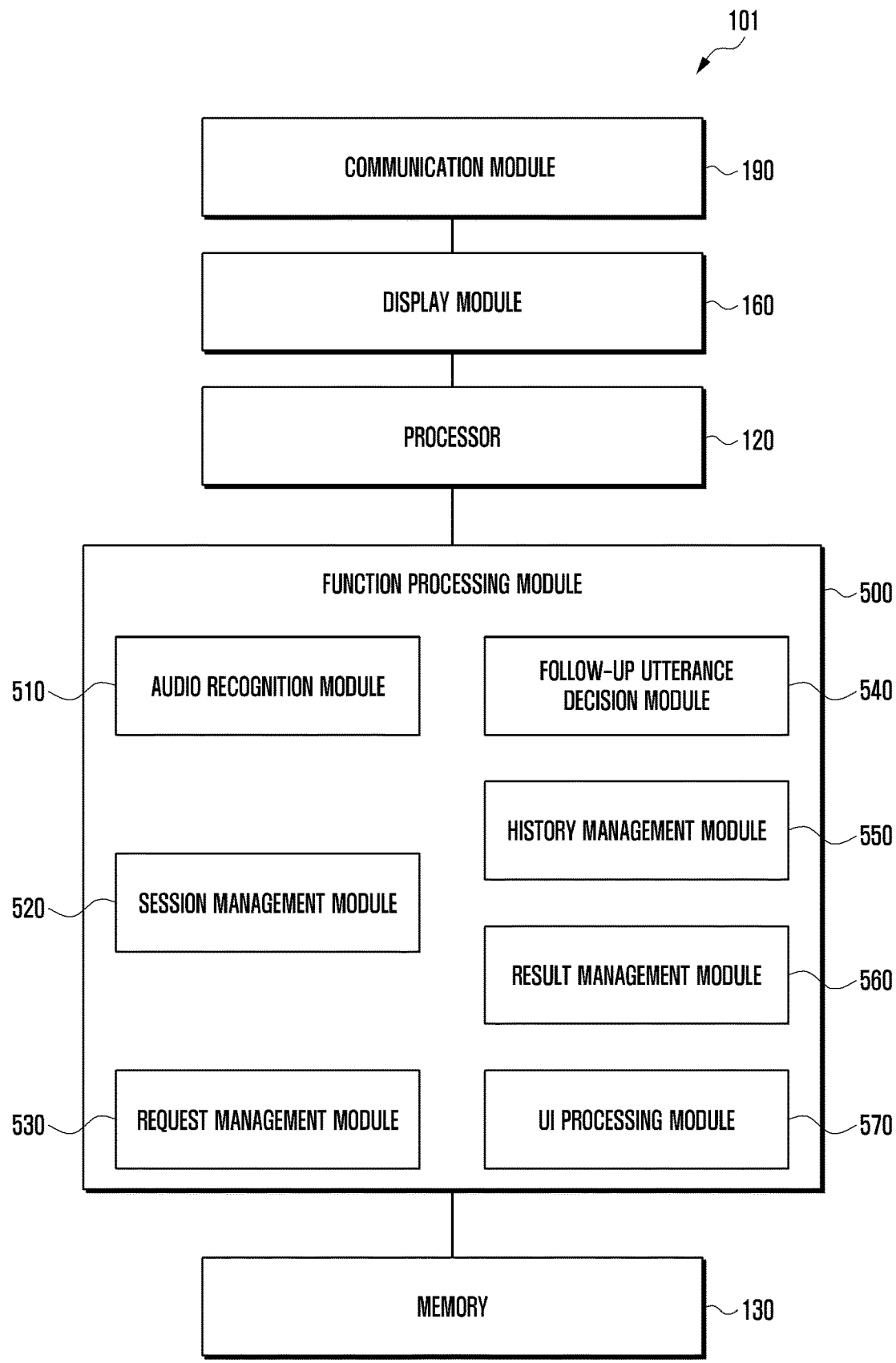
FIG. 5 is a diagram schematically illustrating elements of an electronic device according to an embodiment.

FIG. 5 is a diagram schematically illustrating elements of an electronic device according to an embodiment.

Referring to FIG. 5, the electronic device 101 according to an embodiment may include a communication module 190, a display module 160, a processor 120, a memory 130, and a function processing module 500.

According to an embodiment, the communication module 190 may support a legacy network (e.g., 3G network and/or 4G network), a 5G network, an out of band (OOB), and/or a next-generation communication technology (e.g., new radio (NR) technology). According to an embodiment, the communication module 190 may correspond to the wireless communication module 192 as illustrated in FIG. 1. According to an embodiment, the electronic device 101 may communicate with an external device (e.g., server 108 of FIG. 1, intelligent server 201 of FIG. 2, and/or other electronic devices 102 and 104 of FIG. 1) via a network by using the communication module 190. According to an embodiment, the electronic device 101 may transmit a speech signal of a user's utterance input through the microphone (e.g., microphone 151 of FIG. 2) to the server via the communication module 190 during intelligent service operation, and may receive, from the server, a response result obtained by processing the speech signal of the user utterance.

According to an embodiment, the display module 160 may visually provide various information to the outside (e.g., user) of the electronic device 101. According to an embodiment, the display module 160 may include a touch sensing circuit (or touch sensor) (not shown), a pressure sensor capable of measuring an intensity of a touch, and/or a touch panel (e.g., digitizer) for detecting a stylus pen of a magnetic field type. According to an embodiment, the display module 160 may measure a change in a signal (e.g., voltage, light quantity, resistance, electromagnetic signal and/or, electric charge quantity) for a specific position of the display module 160 on the basis of the touch sensing circuit, the pressure sensor, and/or the touch panel so as to sense a touch input and/or a hovering input (or proximity input). According to an embodiment, the display module 160 may include a liquid crystal display (LCD), an organic light emitted diode (OLED), and an active matrix organic light emitted diode (AMOLED). According to some embodiments, the display module 160 may be configured as a flexible display.

According to an embodiment, the display module 160 may visually provide an execution screen related to performing of an intelligent service and a response result obtained by processing to a user's utterance under control of the processor 120. According to an embodiment, the display module 160 may display various information (e.g., user interface) related to performing of an intelligent service.

According to an embodiment, the memory 130 may correspond to the memory 130 as described in the description with reference to FIG. 1. According to an embodiment, the memory 130 may store various data used by the electronic device 101. The data may include, for example, an application (e.g., program 140 of FIG. 1) and input data or output data for a command related thereto. According to an embodiment, the memory 130 may store instructions that cause, when executed, the processor 120 to operate. For example, the application may be stored as software (e.g., program 140 of FIG. 1) in the memory 130, and may be executable by the processor 120. According to an embodiment, the application may be an application that may use an intelligent service (e.g., AI voice assistant).

According to an embodiment, the memory 130 may include the function processing module 500 related to a function (or operation) of processing an intelligent service, which may be performed by the processor 120. For example, the memory 130 may include at least one module of the function processing module 500 in the form of software. For example, a function of the function processing module 500 may be implemented and stored in the memory 130 in the form of an instruction.

According to an embodiment, the processor 120 may control an operation (or processing) related to processing an intelligent service (e.g., AI voice assistant) in the electronic device 101. According to an embodiment, when providing an intelligent service, the processor 120 may control an operation related to processing, as a follow-up utterance, an utterance input after termination of a session. According to an embodiment, when providing an intelligent service, the processor 120 may control an operation related to extending a support range of a follow-up utterance until after termination of a session related to a previous utterance so that an additional utterance of the user subsequent to termination of the session may be processed as a follow-up utterance associated with (or subsequent to) the previous utterance.

According to an embodiment, after the processor 120 provides a response result of a first utterance of a user, which is input through a microphone (e.g., microphone 151 of FIG. 2), a session related to the first utterance is terminated, and a second utterance input after termination of the session may be processed as a follow-up utterance subsequent to the first utterance. According to an embodiment, if the server fails to process the second utterance input after termination of the session related to the first utterance, or if a capsule (or domain), which is obtained in the server by processing the second utterance input after termination of the session, is different from a capsule (or domain) obtained by processing the previous first utterance, the processor 120 may process the second utterance as a follow-up utterance subsequent to the first utterance by processing the second utterance on the basis of the capsule obtained by processing the first utterance.

According to an embodiment, in a state where the session is terminated, when a response to a subsequently input additional utterance of the user is provided, the processor 120 may determine whether the additional utterance is a follow-up utterance without immediately providing a response result of the corresponding utterance, and may control the display module 160 to provide a single result or a double result according to the determined type of the follow-up utterance. According to an embodiment, the processor 120 may provide a first response result, which is a single result, on the basis of processing of the additional utterance as the follow-up utterance, or may provide the first response result together with a second response result obtained according to root utterance processing, which are two results, on the basis of processing of the additional utterance as a root utterance.

According to an embodiment, the processor 120 may provide the first response result related to the first utterance of the user, which is input via the microphone (e.g., microphone 151 of FIG. 2), and after providing the first response result, may terminate the session related to the first utterance on the basis of a designated condition. According to an embodiment, when acquiring a speech signal according to the user's second utterance input via the microphone (e.g., microphone 151 of FIG. 2) after termination of the session related to the first utterance, the processor 120 may acquire a second response result related to processing of the second utterance.

According to an embodiment, when acquiring the second response result, the processor 120 may determine, based on the second response result, whether to process the second utterance as a follow-up utterance. According to an embodiment, the processor 120 may perform an operation related to reprocessing of the second utterance by designating information related to the first utterance, on the basis of the determination of follow-up utterance processing. According to an embodiment, the processor 120 may acquire a third response result related to reprocessing of the second utterance, based on performing of the operation related to reprocessing of the second utterance, and may provide one or two response results on the basis of the attribute of performing follow-up utterance processing on the second utterance.

According to an embodiment, the processor 120 may provide the third response result obtained according to follow-up utterance processing for the second utterance, based on the attribute (e.g., first attribute or second attribute) of performing follow-up utterance processing on the second utterance, or may provide the second response result obtained according to root utterance processing for the second utterance and the third response result obtained according to follow-up utterance processing for the second utterance.

According to an embodiment, the processor 120 may include the function processing module 500 configured to process an intelligent service. For example, the processor 120 may include at least one module of the function processing module 500, may identify whether to maintain a previous session, in response to an utterance of the user on the basis of at least one module, may process, if the previous session is terminated, the utterance of the user as a follow-up utterance in a new session, and may process a function (or operation) related to providing at least one response result according to the result of the processing.

According to certain embodiments, the processor 120 may control various operations related to a normal function of the electronic device 101 in addition to the above functions. For example, the processor 120 may control its operation and screen display when a designated application is executed. As another example, the processor 120 may receive input signals corresponding to various touch events or proximity event inputs supported by a touch-based or proximity-based input interface, and control function operations accordingly.

According to an embodiment, the function processing module 500 is, for example, a hardware module (e.g., circuitry), and may be included in the processor 120, and/or may be implemented as software including one or more instructions stored in a storage medium (e.g., memory 130) readable by the processor 120. For example, operations performed by the processor 120 may be stored in the memory 130 and may be executed by instructions causing, when executed, the processor 120 to operate.

According to an embodiment, a function (or operation) of the function processing module 500 may be implemented and stored in the memory 130 in the form of an instruction (or command). For example, the function processing module 500 may be understood as, for example, a hardware module (e.g., circuitry), but certain embodiments are not limited thereto. For example, the function processing module 500 may include, additionally or alternatively, a software structure in addition to a hardware structure.

According to an embodiment, the function processing module 500 may be implemented as software (e.g., program 140 of FIG. 1) including one or more instructions stored in a storage medium (e.g., memory 130) readable by the processor 120. According to an embodiment, operations performed by the function processing module 500 may be stored in the memory 130 and may be executed by instructions causing, when executed, the processor 120 to operate.

According to an embodiment, the function processing module 500 may include an audio recognition module 510, a session management module 520, a request management module 530, a follow-up utterance decision module 540 (or follow-up decision module), a history management module 550 (or capsule history module), a result management module 560 (or result handler), and a user interface (UI) processing module 570.

According to an embodiment, the audio recognition module 510 may indicate an embedded automatic speech recognition (eASR) module. According to an embodiment, the audio recognition module 510 may convert, into text data, a speech input received via a microphone (e.g., microphone 151 of FIG. 2) of the electronic device 101 according to a user's utterance, and may transfer the converted text data to the request management module 530.

According to an embodiment, the session management module 520 may indicate a module that manages a session (e.g., connection or maintenance time between the electronic device 101 and the server for service) for the user's utterance on the basis of a designated session management policy. According to an embodiment, the session management policy may be defined in various ways separately for each electronic device 101, and may be defined in various ways even within the electronic device 101 according to an operation mode (or operating application) of a speech assistant. The session management policy may include an input (e.g., home screen moving input or speech assistant termination input) designated for the user to explicitly terminate the session. According to an embodiment, the session management module 520 may provide session information for each connected session, and may configure and provide different session information for each session change.

According to an embodiment, the request management module 530 may indicate a module that requests, from the server, processing (e.g., user utterance processing) on text data (e.g., audio stream) transferred from the audio recognition module 510. According to an embodiment, while a session is being maintained via the session management module 520, the request management module 530 may transfer, to the server via the communication module 190, text data (e.g., audio stream according to an Nth utterance, where N is a natural number) transferred from the audio recognition module 510, and may request utterance processing (e.g., speech recognition and response result) on the text data. According to an embodiment, when text data (e.g., audio stream) is transferred to the server, the request management module 530 may also transfer session information (e.g., Request ID) managed by the session management module 520. For example, when an utterance processing request is received from the electronic device 101, the server (e.g., intelligent server 201 of FIG. 2) (e.g., NLU module) may perform capsule mapping so that a current utterance is processed (e.g., follow-up utterance processing within the same session) by a capsule obtained by processing a previous utterance, on the basis of session information.

According to an embodiment, while a session is being maintained by the session management module 520, the request management module 530 may provide the same session information for text data (e.g., audio stream per user utterance) transferred from the audio recognition module 510. According to an embodiment, when previous session is terminated by the session management module 520 and a new current session is initiated, the request management module 530 may provide session information of the current session, which is different from session information of the previous session, with respect to text data (e.g., audio stream per user utterance) transferred from the audio recognition module 510 in the current session.

According to an embodiment, the follow-up utterance decision module 540 may indicate a module that determines whether to process a user's utterance as a follow-up utterance or root utterance. According to an embodiment, the follow-up utterance decision module 540 may determine, from a response result (e.g., utterance processing result) of the current utterance, whether to process the current utterance as a follow-up utterance subsequent to the previous utterance, and may request the server (e.g., intelligent server 201 of FIG. 2) to process the current utterance as a follow-up utterance during determination as follow-up utterance processing. According to an embodiment, the follow-up utterance decision module 540 may analyze the response result (e.g., utterance processing result) of the user's utterance, and may provide related data to the history management module 550, the result management module 560, or the UI processing module 570, based on a condition suitable for each situation.

According to an embodiment, when follow-up utterance processing is determined based on a response result of a first situation, the follow-up utterance decision module 540 may operate to process a second utterance of the current session as a follow-up utterance and provide a third response result according thereto. According to an embodiment, when follow-up utterance processing is determined based on a response result of a second situation, the follow-up utterance decision module 540 may operate to provide both a second response result obtained by processing the second utterance of the current session as a root utterance and a third response result obtained by processing the second utterance of the current session as a follow-up utterance.

According to an embodiment, as a method for determining whether a current utterance is a follow-up utterance of a previous utterance, the follow-up utterance decision module 540 may compare a capsule ID, a service ID, a device type, a conversation ID, a capsule name, a device locale, and/or a time zone. According to an embodiment, an operation of the follow-up utterance decision module 540 will be described with reference to drawings to be described later.

According to an embodiment, the history management module 550 may indicate a module that manages (e.g., stores) a history (e.g., session information and capsule identifier (e.g., capsule ID)) of a capsule processed with respect to a user utterance. According to an embodiment, the history management module 550 may store and manage session information of a previous utterance and a capsule identifier of a capsule for processing of the previous utterance. According to an embodiment, the history management module 550 may store (or update) and manage a user utterance, a capsule identifier (e.g., capsule ID) of a capsule in which a user utterance has been processed, a capsule identifier of a capsule selected by a user from among multiple capsules in which a user utterance has been processed, and/or information on time (e.g., termination time of previous session (e.g., timestamp)) at which a user utterance has been processed. According to an embodiment, an operation of the history management module 550 will be described with reference to the drawings to be described later.

According to an embodiment, the result management module 560 may indicate a module that manages a result (e.g., response result per user utterance) processed in a capsule. According to an embodiment, the result management module 560 may store and manage, based on the operation of the follow-up utterance decision module 540, a first processed response result obtained by processing an utterance in a current session as a root utterance and a second processed response result obtained by processing an utterance in the current session as a follow-up utterance. According to an embodiment, the result management module 560 may transfer a single response result (e.g., response result according to follow-up utterance processing) to the UI processing module 570 or may transfer two response results (e.g., response result according to follow-up utterance processing and response result according to root utterance processing) to the UI processing module 570, based on determination of the follow-up utterance decision module 540. According to an embodiment, an operation of the result management module 560 will be described with reference to the drawings to be described later.

According to an embodiment, the UI processing module 570 may indicate a module that provides one or more results. According to an embodiment, the UI processing module 570 may provide one response result or two response results, based on the operation of the follow-up utterance decision module 540. According to an embodiment, an operation of the UI processing module 570 will be described with reference to the drawings to be described later.

Certain embodiments described in the disclosure may be implemented within a recording medium readable by a computer or a similar device by using software, hardware, or a combination thereof. According to hardware implementation, operations described in certain embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or other electrical units for performing functions.

In certain embodiments, a recording medium may include a computer-readable recording medium in which a program is recorded, such that the program is for execution of providing a first response result related to a first utterance of a user, which is input via a microphone (e.g., microphone 151 of FIG. 2), terminating a session related to the first utterance, acquiring, after the session related to the first utterance is terminated, a speech signal according to a second utterance of the user, which is input via the microphone, acquiring a second response result related to processing of the second utterance, determining, based on the second response result, whether to perform follow-up utterance processing on the second utterance, reprocessing the second utterance by designating information related to the first utterance on the basis of determining of the follow-up utterance processing, acquiring a third response result related to reprocessing of the second utterance, and providing one or two response results on the basis of attributes of performing follow-up utterance processing on the second utterance.

As described above, certain embodiments may include processing a current utterance as a follow-up utterance subsequent to a previous utterance in a state where a session has been terminated. According to an embodiment, in a case (e.g., first situation or un-handled situation) where the electronic device 101 has failed to process a user utterance input after termination of a session with respect to a previous utterance, or in a case (e.g., second situation or misunderstood situation) where a capsule having processed the utterance input after termination of the session is processed in a capsule differing from a capsule (e.g., second capsule) having processed the previous utterance, the electronic device 101 may request to perform utterance processing one more time on the basis of the capsule (e.g., second capsule) having processed the previous capsule, without immediately outputting a response result of the user utterance, thereby enabling follow-up utterance processing. For example, in certain embodiments, a support range of a follow-up utterance for a user utterance may be supported to be extended until after termination of a session.

According to certain embodiments, when an utterance (e.g., first utterance) is input, the input first utterance is analyzed and, after an utterance-based response, a subsequently input utterance (e.g., second utterance) is analyzed in a state where a session is terminated (e.g., timeout or termination according to a specified input of a user), the electronic device 101 may identify a first situation or a second situation, and may perform follow-up utterance or root utterance processing on a second utterance under a condition corresponding to the first situation or the second situation.

According to an embodiment, the first situation is a case in which an utterance subsequent to termination of a session cannot be processed, and may include, for example, a case in which the server fails in capsule mapping (or fails in recognition) with respect to an utterance subsequent to termination of the session, so that a response result, such as "I did not understand", occurs. According to an embodiment, the second situation is a case in which an utterance subsequent to termination of a session is recognized as a root utterance, and the utterance is processed in a capsule differing from a previous capsule, and may include, for example, a case in which, after an utterance of "How's the weather?", a result for an utterance of "in New York?" in a new session is processed in a second capsule (e.g., capsule B, clock capsule) instead of a first capsule (e.g., capsule A, weather capsule), thereby informing of the time in New York.

According to an embodiment, in the first situation (e.g., when utterance processing fails), the electronic device 101 may use a previously processed capsule identifier (or domain information) to process a second utterance as a follow-up utterance subsequent to a first utterance, and provide a corresponding first response result.

According to an embodiment, in the second situation (e.g., when an input second utterance-based processing capsule (or domain) is different from a capsule (or domain) executed for a first utterance), the electronic device 101 may manage (e.g., store) a first response result obtained in a corresponding capsule with respect to a second utterance, may process the second utterance as a follow-up utterance subsequent to the first utterance by using a previously processed capsule identifier, and may acquire a corresponding second response result so as to provide both the first response result and the second response result. For example, the electronic device 101 may provide a user with result information about two different capsules (or domains) or may determine a more suitable capsule so as to provide a corresponding response result. For example, a user may input a second utterance for a root utterance after a session for a first utterance is terminated. To this end, in consideration of the user intended root utterance, the electronic device 101 may provide both of two response results, such as a response result obtained by processing as a root utterance and a response result obtained by processing as a follow-up utterance, so as to allow the user to selectively acquire a result.

According to an embodiment, in the examples of FIG. 6 and FIG. 7 below, when a user inputs an utterance via the speech assistant, the electronic device 101 may transfer an audio stream (or speech signal) based on the user's utterance to a server 600 (e.g., intelligent server 201 of FIG. 2), and a result obtained by processing in the server 600 may be again output as speech (voice) through a speaker (e.g., speaker 155 of FIG. 2) or displayed on a screen via the display module 160 by the electronic device 101.

According to an embodiment, the server 600 may be classified in various ways according to roles. For example, the server 600 may include various modules, such as an SR module 620 (e.g., ASR module 221 of FIG. 2) that converts an audio stream into natural language text, an NLU module 630 (e.g., NLU module 223 of FIG. 2) that discovers and maps a capsule to process natural language which has been converted into text, a TTS module 640 (e.g., TTS module 229 of FIG. 2) that converts natural language text into a reproducible audio stream and provides the same, and/or a capsule module 650 (e.g., capsule database 230 of FIG. 2) that stores multiple capsules in the form of a concept action network (CAN) and stores information on relationships of multiple concepts and operations corresponding to multiple domains.

Figure 6:
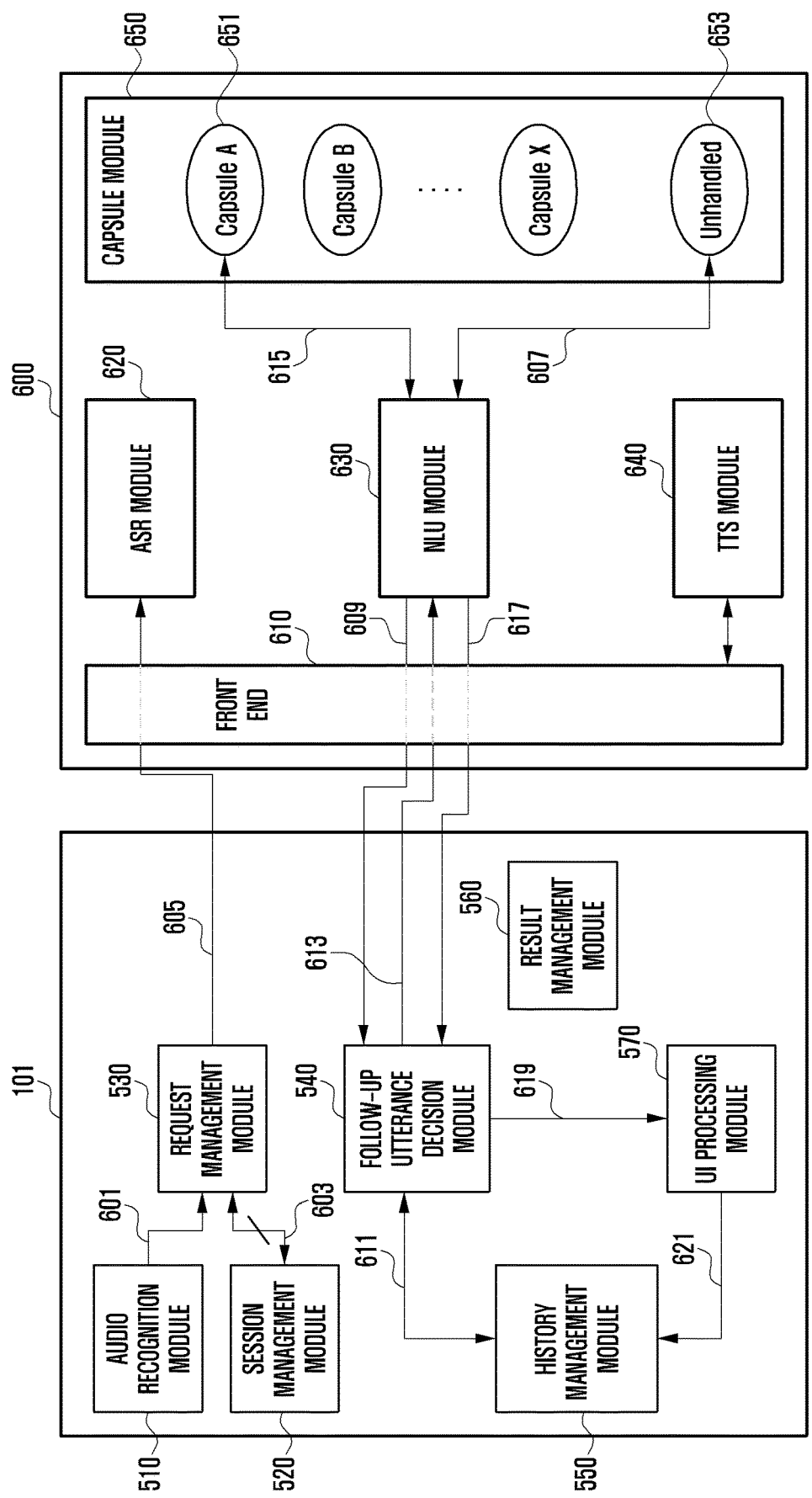
FIG. 6 is a diagram for illustrating an example of processing a follow-up utterance between an electronic device and a server according to an embodiment.
Figure 7:
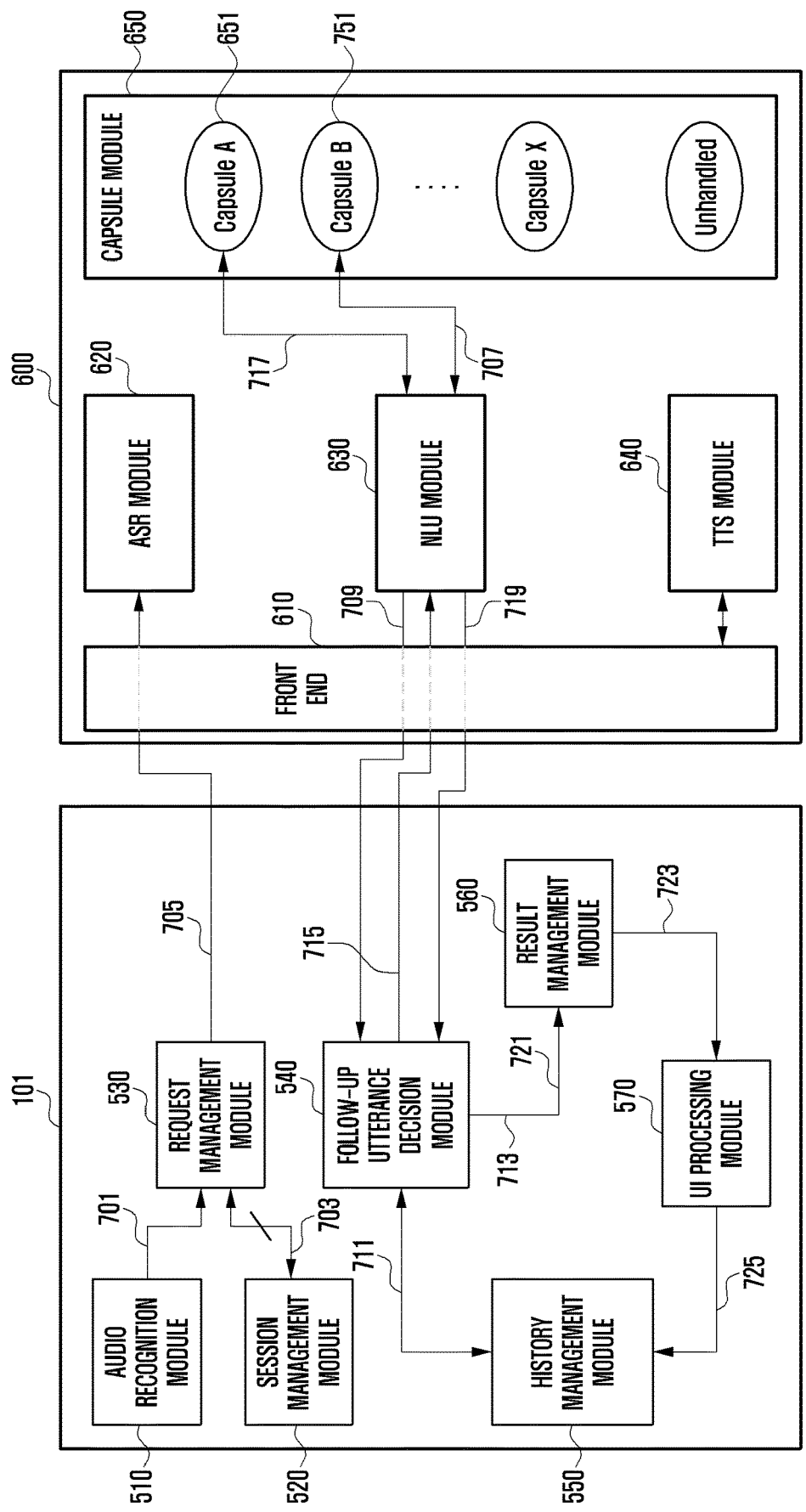
FIG. 7 is a diagram for illustrating an example of processing a follow-up utterance between an electronic device and a server according to an embodiment.

According to an embodiment, the server 600 is not limited to the elements shown in FIG. 6 or FIG. 7, and may be implemented including, for example, various modules as illustrated in FIG. 2. According to an embodiment, a front end 610 (e.g., front end 210 of FIG. 2) may exist between the electronic device 101, the server 600, and respective modules of the server 600, and data may be exchanged between the electronic device 101, the server, so respective modules of the server 600 via the front end 610.

According to an embodiment, the front end 610 may support management of a session that connects the electronic device 101 and the server 600. For example, the front end 610 may indicate, to the electronic device 101, a module to be connected from among multiple modules of the server 600, or may inform which module to exchange data with between the respective modules of the server 600. According to an embodiment, the front end 610 may be referred to as a capsule execution service (CES).

FIG. 6 is a diagram for illustrating an example of processing a follow-up utterance between an electronic device and a server according to an embodiment.

According to an embodiment, the electronic device 101 may classify a first situation (e.g., un-handled situation) and a second situation (e.g., misunderstood situation) so as to perform follow-up utterance processing, with respect to an utterance processing result (e.g., response result) from the server 600 (e.g., intelligent server 201 of FIG. 2) for a current utterance. According to an embodiment, FIG. 6 may show an example of an operation performed by the electronic device 101 in a first situation. According to an embodiment, the first situation is a case in which an utterance subsequent to termination of a session cannot be processed, and may include, for example, a case in which the server 600 fails in capsule mapping for the utterance subsequent to session termination.

Referring to FIG. 6, when a user inputs an utterance, the electronic device 101 may, in operation 601, convert a speech signal according to the user's utterance into an audio stream via the audio recognition module 510 and transfer the audio stream to the request management module 530 in real time. According to an embodiment, as illustrated in operation 603, the electronic device 101 may be in a state where a previous session has been terminated, and may generate new session information (e.g., conversation ID and request ID) for the user's utterance so as to initiate a new session, in operation 601.

In operation 605, the electronic device 101 may transmit the audio stream according to the user's utterance to the server 600 at substantially the same time when requesting, via the request management module 530, the server 600 to initiate a new session. According to an embodiment, the audio stream according to the user's utterance may be, for example, transferred to an ASR module 620 via the front end 610 of the server 600 and converted into NL text.

According to an embodiment, the NLU module 630 of the server 600 may discover and map a capsule capable of processing the NL text converted through the ASR module 620. According to an embodiment, FIG. 6 may show an example in which the NLU module 630 fails in capsule mapping for processing of NL text so that NL text is processed in an un-handled capsule 653. For example, when the previous session is terminated, it cannot be guaranteed that the NLU module 630 maps a previous capsule (e.g., capsule A 651). Accordingly, despite the user's intention to process as a follow-up utterance, processing is performed as if the utterance is a root utterance, and recognition of the utterance thus fails (e.g., failure in capsule mapping) so that, as a result, there may be a situation where the utterance cannot be processed.

According to an embodiment, the server 600 may process, in operation 607, a recognition failure for the NL text via the un-handled capsule 653, and may transmit, in operation 609, a response result (e.g., result of "I did not understand well") for un-handled processing to the electronic device 101.

According to an embodiment, in operation 611, if a response result of the server 600 is an un-handled response result (e.g., recognition failure), the follow-up utterance decision module 540 of the electronic device 101 may acquire a capsule ID (e.g., capsule A 651) of a capsule, in which a previous utterance has been processed, via the history management module 550. According to an embodiment, when a recognition failure occurs with respect to the user's utterance, the electronic device 101 may process an operation for follow-up utterance processing without immediately providing a response result thereof.

According to an embodiment, in operation 613, the follow-up utterance decision module 540 may, while specifying and transferring a capsule ID (e.g., capsule A 651) associated with the previous utterance, which is acquired from the history management module 550, request reprocessing of NL text of the current utterance, the recognition of which has been failed, on the basis of the capsule of the corresponding capsule ID. For example, the electronic device 101 may specify a capsule ID to the server 600 so as to designate a capsule to process the NL text, and the server 600 may process the NL text on the basis of the designated capsule (e.g. capsule A 651).

According to an embodiment, in operation 615, the NLU module 630 may request processing of the NL text of the current utterance from the capsule (e.g. capsule A 651) corresponding to the capsule ID specified by the electronic device 101, and may receive a processing result thereof. For example, the server 600 may process the current utterance as a follow-up utterance of the previous utterance, based on the capsule designated by the electronic device 101. According to an embodiment, in operation 617, the NLU module 630 may provide a response result obtained by processing the NL text in the designated capsule (e.g. capsule A 651) to the follow-up utterance decision module 540 of the electronic device 101.

According to an embodiment, the follow-up utterance decision module 540 may receive the response result from the server 600, and may transfer the response result to the UI processing module 570 in operation 619.

According to an embodiment, the UI processing module 570 may output the response result according to a designated output scheme, and may transfer information (e.g., processing completion information) on response result processing to the history management module 550 in operation 621.

According to an embodiment, the history management module 550 may manage information related to follow-up utterance processing for the user utterance, based on the processing completion information of the UI processing module 570. According to an embodiment, the history management module 550 may store (or update) and manage a user utterance, a capsule identifier (e.g., capsule ID) of a capsule (e.g. capsule A 651) in which a user utterance has been processed, and/or information on time (e.g., termination time (e.g., timestamp) of previous session) at which a user utterance has been processed.

As illustrated in FIG. 6, if the session for the previous utterance is terminated, and recognition of a user utterance fails (e.g., processed by an un-handled capsule) in a new session, the user utterance may be reprocessed based on the capsule in which the previous utterance of the previous session has been processed, and the utterance of the new session may be processed as a follow-up utterance subsequent to the utterance of the previous session. For example, a user may speak a first utterance of "Tell me about today's weather" in a first session, and after the first session is terminated under a designated condition, the user may input a second utterance of "How about New York?" in a second session. In this case, since the first session on the weather has already expired, the un-handled capsule 653 may process the second utterance so as to return a response result. The response result obtained by processing by the un-handled capsule 653 may not be separately stored, and the second utterance is reprocessed via a weather capsule (e.g., weather news), which is the previous capsule (e.g., capsule A 651) in which the first utterance has been processed, and a processing result thereof may be provided to the user as a response result for the second utterance.

According to an embodiment, in a case of a speaker without the display module 160 or an operation mode (e.g., mobile driving mode or hidden mode) in which the use of the display module 160 is restricted, the electronic device 101 may output the response result as audio via TTS so as to provide the same to the user. According to another embodiment, if the display module 160 is present, and in a case of an operation mode in which the use of the display module is possible, the electronic device 101 may output a response result on a screen so as to provide the same to the user.

FIG. 7 is a diagram for illustrating an example of processing a follow-up utterance between an electronic device and a server according to certain embodiments.

According to an embodiment, the electronic device 101 may classify a first situation (e.g., un-handled situation) and a second situation (e.g., misunderstood situation) so as to perform follow-up utterance processing with respect to an utterance processing result (e.g., response result) from the server 600 (e.g., intelligent server 201 of FIG. 2) for a current utterance. According to an embodiment, FIG. 7 may show an example of an operation performed by the electronic device 101 in a second situation. According to an embodiment, the second situation may include a case in which an utterance subsequent to termination of a session is recognized as a root utterance and the utterance is processed in a capsule different from a previous capsule.

Referring to FIG. 7, when a user inputs an utterance, the electronic device 101 may, in operation 701, convert a speech signal according to the user's utterance into an audio stream via the audio recognition module 510 and transfer the audio stream to the request management module 530 in real time. According to an embodiment, as illustrated in operation 703, the electronic device 101 may be in a state where a previous session has been terminated, and may generate new session information (e.g., conversation ID and request ID) for the user's utterance so as to initiate a new session, in operation 701.

In operation 705, the electronic device 101 may transmit the audio stream according to the user's utterance to the server 600 at substantially the same time when requesting, via the request management module 530, the server 600 to initiate a new session. According to an embodiment, the audio stream according to the user's utterance may be, for example, transferred to the ASR module 620 via the front end 610 of the server 600 and converted into NL text.

According to an embodiment, the NLU module 630 of the server 600 may discover and map a capsule capable of processing the NL text converted through the ASR module 620. According to an embodiment, FIG. 7 may show an example in which, in capsule mapping for processing the NL text, the NLU module 630 performs processing in a new capsule (e.g., capsule B 751) according to a new session, which is different from a capsule (e.g., capsule A 651) for processing of a previous utterance. For example, when the previous session is terminated, it cannot be guaranteed that the NLU module 630 maps the previous capsule (e.g., capsule A 651). Therefore, despite the user's intention to process as a follow-up utterance, processing is performed as if the utterance is root utterance, and there may be a situation in which the utterance is processed in a capsule (e.g., capsule B 751) other than the capsule (e.g., capsule A 651) in which the previous utterance has been processed.

According to an embodiment, the NL text may be processed as a root utterance via the mapped capsule (e.g., capsule B 751) of the server 600 in operation 707, and a response result for the root utterance processing may be transmitted to the electronic device 101 in operation 709.

According to an embodiment, in operation 711, if the response result of the server 600 is received, the follow-up utterance decision module 540 of the electronic device 101 may acquire a capsule ID of the capsule (e.g., capsule A 651), in which the previous utterance has been processed, from the history management module 550.

According to an embodiment, a capsule ID of the capsule in which the previous utterance has been processed and a capsule ID of the capsule (e.g., capsule B 751) in which the current utterance is processed are compared, and if the capsule IDs are different from each other (e.g., capsule A capsule B), the follow-up utterance decision module 540 may transfer, to the result management module 560, a current response result (e.g., first response result) obtained by processing in the capsule (e.g., capsule B 751) in which the current utterance is processed, and may store the same, in operation 713. According to an embodiment, as a method for determining whether the current utterance is a follow-up utterance of the previous utterance, the follow-up utterance decision module 540 may compare not only capsule IDs but also, for example, service IDs, device types, conversation IDs, capsule names, device locales, and/or time zones.

According to an embodiment, after storing the current response result, the follow-up utterance decision module 540 may, while specifying and transferring the capsule ID of the capsule (e.g., capsule A 651) in which the previous utterance has been processed, request reprocessing of NL text of the current utterance in operation 715 on the basis of the capsule of the capsule ID. For example, the electronic device 101 may specify a capsule ID to the server 600 so as to designate a capsule to process the NL text, and the server 600 may process the NL text on the basis of the designated capsule (e.g. capsule A 651).

According to an embodiment, in operation 717, the NLU module 630 may request processing of the NL text of the current utterance from the capsule (e.g. capsule A 651) corresponding to the capsule ID specified by the electronic device 101, and may receive a processing result thereof. For example, the server 600 may process the current utterance as a follow-up utterance of the previous utterance, based on the capsule designated by the electronic device 101. According to an embodiment, in operation 719, the NLU module 630 may provide a response result obtained by processing the NL text in the designated capsule (e.g. capsule A 651) to the follow-up utterance decision module 540 of the electronic device 101.

According to an embodiment, the follow-up utterance decision module 540 may receive a response result (e.g., second response result for the current utterance) from the server 600, and may transfer the response result to the result management module 560 and store the same, in operation 721.

According to an embodiment, in operation 723, the result management module 560 may transfer a first response result (e.g., response result of root utterance processing performed in capsule B 751) for the current utterance and a second response result (e.g., response result of follow-up utterance processing performed in capsule A 651) to the UI processing module 570.

According to an embodiment, the UI processing module 570 may output two response results according to a specified scheme, may briefly provide the results to the user, and may receive the user's selection for the two response results.

According to an embodiment, the UI processing module 570 may output a user-selected response result according to a designated output scheme, and may transfer information (e.g., processing completion information) on response result processing to the history management module 550, in operation 725.

According to an embodiment, the history management module 550 may manage information related to follow-up utterance processing or root utterance processing for the user utterance, based on the processing completion information of the UI processing module 570. According to an embodiment, the history management module 550 may store (or update) and manage a user utterance, a capsule identifier (e.g., capsule ID) of a capsule (e.g., capsule A 651 or capsule B 751) selected by a user from among capsules (e.g., capsule A 651 and capsule B 751) in which the user utterance has been processed, and/or information (e.g., timestamp) of time at which the user utterance has been processed.

As illustrated in FIG. 7, if the session for the previous utterance is terminated, and a user utterance is processed by a capsule other than the capsule, in which the previous utterance has been processed, in a new session, the user utterance may reprocessed based on the capsule in which the previous utterance of the previous session has been processed, and the utterance of the new session may be processed as a follow-up utterance subsequent to the utterance of the previous session. For example, the user may speak "Make a reminder to go shopping tomorrow at 5 o'clock" in a first session, and after the first session is terminated under a designated condition, the user may input a second utterance of "Change it to 6 o'clock" in a second session. In this case, the first utterance may be processed in a reminder capsule, and the second utterance may be processed in a date and time capsule different from the reminder capsule. In this case, a first response result for the second utterance, which is processed in the date and time capsule, may be stored, the user utterance may be reprocessed in the reminder capsule that is the capsule of the first session, and the second response result obtained by reprocessing in the reminder capsule may be acquired and provided to the user together with the first response result which has been previously stored.

According to an embodiment, in a case of a speaker without the display module 160 or an operation mode (e.g., mobile driving mode or hidden mode) in which the use of the display module 160 is restricted, the electronic device 101 may output two response results as audio via TTS so as to allow the user to make a selection. According to another embodiment, if the display module 160 is present, and in a case of an operation mode in which the use of the display module is possible, the electronic device 101 may output two response results on a screen so as to allow the user to make a selection.

According to an embodiment, the electronic device 101 or the server 600 (e.g., intelligent server 201 of FIG. 2) may include a speech recognition device (e.g., speech assistant) for supporting a speech recognition service according to certain embodiments of the disclosure, and a single entity of the electronic device 101 or the server 600 may process certain embodiments of the disclosure.

According to an embodiment, the electronic device 101 may implement a speech recognition device (e.g., speech assistant) including, for example, an element for speech recognition processing in the server 600 as illustrated in FIG. 2, FIG. 6, or FIG. 7, and may operate in a manner of performing speech recognition processing standalone without interaction with the server 600.

According to another embodiment, the server 600 may implement a speech recognition device (e.g., speech assistant) including, for example, at least some elements (e.g., follow-up utterance decision module 540, history management module 550, and/or result management module 560) of the function processing module 500 as illustrated in FIG. 5, FIG. 6, or FIG. 7, and may operate in such a way of processing, in a standalone manner, a speech signal related to an utterance transferred from the electronic device 101, and providing a response result for follow-up utterance or root utterance processing to the electronic device 101.

According to certain embodiments, the speech recognition device (e.g., speech assistant) for follow-up utterance processing and speech recognition processing may be implemented as a hardware module or a software module so as to be implemented in the form mounted on the electronic device 101 or the server 600, and may process operations according to certain embodiments by one element (e.g., electronic device 101 or server 600) including the speech recognition device.

A device (e.g., electronic device 101 or server 201 or 600) for supporting a speech recognition service according to an embodiment of the disclosure may include a memory, and a speech recognition device (e.g., elements of the function processing module 500 of FIG. 5 and the intelligent server 201 of FIG. 2) (or processor) operatively connected to the memory, such that the speech recognition device (or processor) is configured to provide a first response result related to a first utterance of a user, terminate a session related to the first utterance, acquire a second utterance of the user after the session related to the first utterance is terminated, acquire a second response result related to processing of the second utterance, determine, based on the second response result, whether to perform follow-up utterance processing on the second utterance, reprocess the second utterance on the basis of information related to the first utterance, based on determining of performing the follow-up utterance processing, acquire a third response result related to reprocessing of the second utterance, and provide the third response result.

According to an embodiment, the speech recognition device may be configured to, after processing the first utterance on the basis of a designated first capsule, provide a first response result corresponding thereto in a designated manner, and after providing the first response result related to the first utterance, terminate the session of the first utterance on the basis of sensing a condition designated in relation to the session.

According to an embodiment, the speech recognition device may be configured to map a capsule for processing of the second utterance, process the second utterance on the basis of the mapped capsule, and acquire the second response result corresponding to processing of the second utterance.

According to an embodiment, the speech recognition device may be configured to determine a history related to the first utterance, based on acquisition of the second response result, analyze the second response result obtained by processing the second utterance if a history related to the first utterance exists, and determine whether to perform the follow-up utterance processing, based on a result of analyzing the second response result.

According to an embodiment, the speech recognition device may be configured to, if the history related to the first utterance exists, determine follow-up utterance processing or root utterance processing for the second utterance by referring to a termination time of the session.

According to an embodiment, the speech recognition device may be configured to, if the second response result is a response result of a first situation due to a failure in recognition of the second utterance, or if the second response result is a response result of a second situation in which the second utterance is processed in a second capsule differing from the first capsule in which the first utterance has been processed, determine follow-up utterance processing for the second utterance.

According to an embodiment, the speech recognition device may be configured to acquire a capsule identifier of the first capsule in which the first utterance has been processed, based on determining of processing the second utterance as a follow-up utterance, designate the first capsule of the acquired capsule identifier as a capsule for reprocessing of the second utterance, and reprocess the second utterance on the basis of the designated first capsule.

According to an embodiment, the speech recognition device may be configured to, when determining follow-up utterance processing on the basis of the response result of the first situation, provide the third response result obtained according to follow-up utterance processing for the second utterance, and when determining follow-up utterance processing on the basis of the response result of the second situation, provide the second response result obtained according to root utterance processing for the second utterance and the third response result obtained according to follow-up utterance processing for the second utterance.

The electronic device 101 according to an embodiment of the disclosure may include the communication module 190, the display module 160, the microphone 151, the memory 130, and the processor 120, such that the processor 120 is configured to provide a first response result related to a first utterance of a user, which is input via the microphone 151, terminate a session related to the first utterance, acquire, after the session related to the first utterance is terminated, a speech signal according to a second utterance of the user, which is input via the microphone 151, acquire a second response result related to processing of the second utterance, determine, based on the second response result, whether to perform follow-up utterance processing on the second utterance, reprocess the second utterance by designating information related to the first utterance on the basis of determining of the follow-up utterance processing, acquire a third response result related to reprocessing of the second utterance, and provide one or two response results on the basis of attributes of performing follow-up utterance processing on the second utterance.

According to an embodiment, the processor 120 may be configured to determine a history related to the first utterance, based on acquisition of the second response result, analyze the second response result obtained by processing the second utterance if the history related to the first utterance exists, and determine whether to perform the follow-up utterance processing, based on a result of analyzing the second response result.

According to an embodiment, the processor 120 may be configured to, if the history related to the first utterance exists, determine follow-up utterance processing or root utterance processing for the second utterance by referring to a termination time of the session.

According to an embodiment, the processor 120 may be configured to, if the second response result is a response result of a first situation due to a failure in recognition of the second utterance, or if the second response result is a response result of a second situation in which the second utterance is processed in a second capsule differing from the first capsule in which the first utterance has been processed, determine follow-up utterance processing for the second utterance.

According to an embodiment, the processor 120 may be configured to acquire a capsule identifier of the first capsule in which the first utterance has been processed, based on determining of processing the second utterance as a follow-up utterance, transmit the acquired capsule identifier to the server, and request reprocessing of the second utterance from the server on the basis of the first capsule of the capsule identifier.

According to an embodiment, the processor 120 may be configured to, when determining follow-up utterance processing on the basis of the response result of the first situation, provide the third response result obtained according to follow-up utterance processing for the second utterance, and when determining follow-up utterance processing on the basis of the response result of the second situation, provide the second response result obtained according to root utterance processing for the second utterance and the third response result obtained according to follow-up utterance processing for the second utterance.

Hereinafter, an operation method of the electronic device 101 according to certain embodiments will be described in detail. According to certain embodiments, operations performed by the electronic device 101, which will be described below, may be executed by a processor (e.g., processor 120 of FIG. 1 or FIG. 5) including at least one processing circuitry of the electronic device 101. According to an embodiment, the operations performed by the electronic device 101 may be stored in the memory 130, and may be executed by instructions that cause, when executed, the processor 120 to operate.

Figure 8:
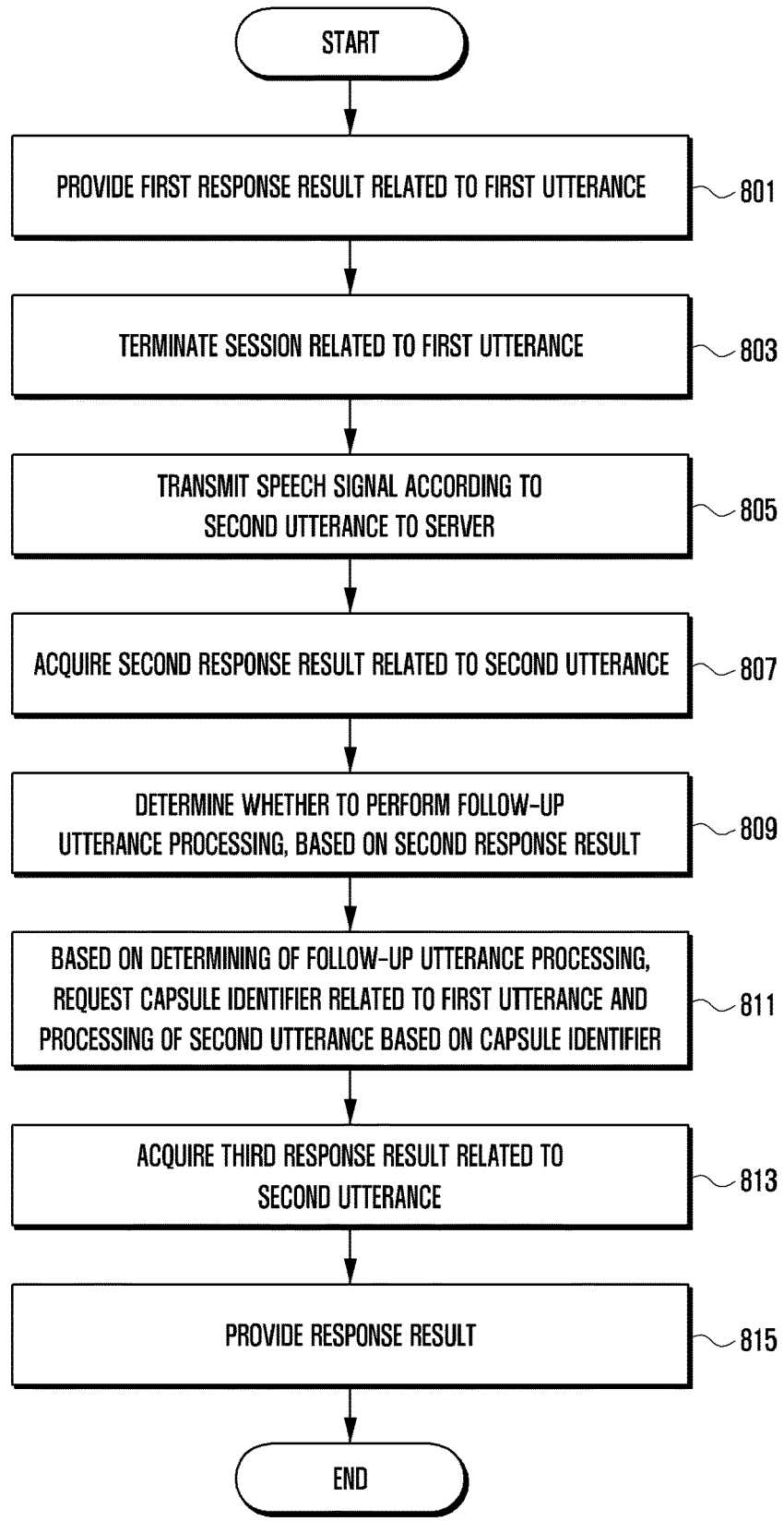
FIG. 8 is a flowchart illustrating an operation method of an electronic device according to an embodiment.

FIG. 8 is a flowchart illustrating an operation method of an electronic device according to an embodiment.

Referring to FIG. 8, in operation 801, the processor 120 of the electronic device 101 may provide a first response result related to a first utterance. According to an embodiment, the processor 120 may transmit a speech signal (or audio stream) based on the first utterance to the server 600 in response to a user's first utterance input, and may acquire the first response result obtained by processing of the first utterance by the server 600. According to an embodiment, the processor 120 may provide the user with the first response result in the form of visual information and/or auditory information, based on a designated output scheme (e.g., UI display and/or audio output).

In operation 803, the processor 120 may terminate a session related to the first utterance. According to an embodiment, after providing the first response result related to the first utterance, the processor 120 may manage the session of the first utterance, and may subsequently terminate the session when detected a designated condition set for cancellation of the session.

According to an embodiment, the designated condition may be based on, for example, a designated session management policy. For example, the processor 120 may terminate a communication session with the user when expiry of a session maintenance time is detected. For example, the session maintenance time may be defined in various ways according to an operation mode, such that, for example, basic N minutes (N is a natural number) may be configured in a normal operation mode, and M seconds (M is a natural number) may be configured in a designated operation mode (e.g., driving mode). According to an embodiment, the processor 120 may reproduce (e.g., TTS reproduction) the first response result as audio in the driving mode, and then may automatically terminate the session after M seconds (e.g., about 4 seconds). As another example, the processor 120 may terminate the session, based on the user's explicit input (e.g., moving a home screen or terminating the speech assistant).

In operation 805, the processor 120 may transmit a speech signal (or an audio stream) of a second utterance to the server 600. According to an embodiment, after the session for the first utterance is terminated, the processor 120 may transmit the speech signal (or audio stream) of the second utterance to the server 600 in response to receiving input of the second utterance from the user. Since the first session was terminated (in operation 803), the second utterance may be transmitted in a new session.

In operation 807, the processor 120 may acquire a second response result for the second utterance. According to an embodiment, the second response result may be generated by the server 600 processing the second utterance. The server 600 may transmit the second response result back to the electronic device 101.

In operation 809, the processor 120 may determine whether to perform follow-up utterance processing, based on the second response result. According to an embodiment, when receiving the second response result, the processor 120 may determine whether a history of a previous utterance (e.g., first utterance) is extant. According to an embodiment, if the history related to the previous utterance is extant, the processor 120 may analyze the second response result, and determine whether the second response result is an un-handled response result (e.g., a response result of a first situation) obtained as a consequence of a recognition failure (e.g., capsule mapping failure) on the part of the server 600, or is a response result (e.g., response result of a second situation) in which the second utterance is erroneously processed in a second capsule different from the first capsule in which the previous utterance is processed.

According to an embodiment, if the second response result indicates the first situation or the second situation, the processor 120 may determine follow-up utterance processing for the second utterance. According to an embodiment, based on determination of the follow-up utterance processing, the second response result may be managed without being output immediately.

According to an embodiment, the processor 120 may determine whether to execute follow-up utterance processing, by referring to time information (e.g., termination time (e.g., timestamp) of the previous session) related to the previous utterance. For example, since follow-up utterance processing may be meaningless if a session termination time of the previous utterance exceeds (e.g., exceeding certain time limit based on a current utterance) a designated certain time (e.g., units of days, hours, or minutes), the processor 120 may determine the second utterance as a root utterance and may immediately output the second response result obtained according to the determination as the root utterance.

In operation 811, the processor 120 may request, based on determination of follow-up utterance processing for the second utterance, a capsule identifier (e.g., capsule ID) related to the first utterance, and processing of the second utterance based on the capsule identifier. According to an embodiment, when determining to execute follow-up utterance processing, the processor 120 may acquire a capsule identifier (e.g., capsule ID), in which the first utterance was processed, and may request the server 600 to reprocess the second utterance using the same capsule, as identified by the corresponding capsule identifier. According to an embodiment, the processor 120 may map and manage various information (e.g., user utterance, session information, capsule identifier of a capsule in which a user utterance is processed, and/or information on time at which the user utterance is processed) related to utterance processing for the user utterance.

In operation 813, the processor 120 may acquire a third response result related to the second utterance. According to an embodiment, the processor 120 may acquire the third response result, as reprocessed using a designated capsule for the second utterance by the server 600.

In operation 815, the processor 120 may output the response result. According to an embodiment, the processor 120 may output the third response result generated from processing the second utterance as a follow-up utterance, based on a first attribute (e.g., follow-up utterance processing for the response result of the first situation) of performing follow-up utterance processing. According to an embodiment, the processor 120 may provide both the second response result generated from processing the second utterance as a root utterance, and the third response result generated from processing the second utterance as a follow-up utterance, based on a second attribute (e.g., follow-up utterance processing for the response result of the second situation) of performing follow-up utterance processing.

Figure 9:
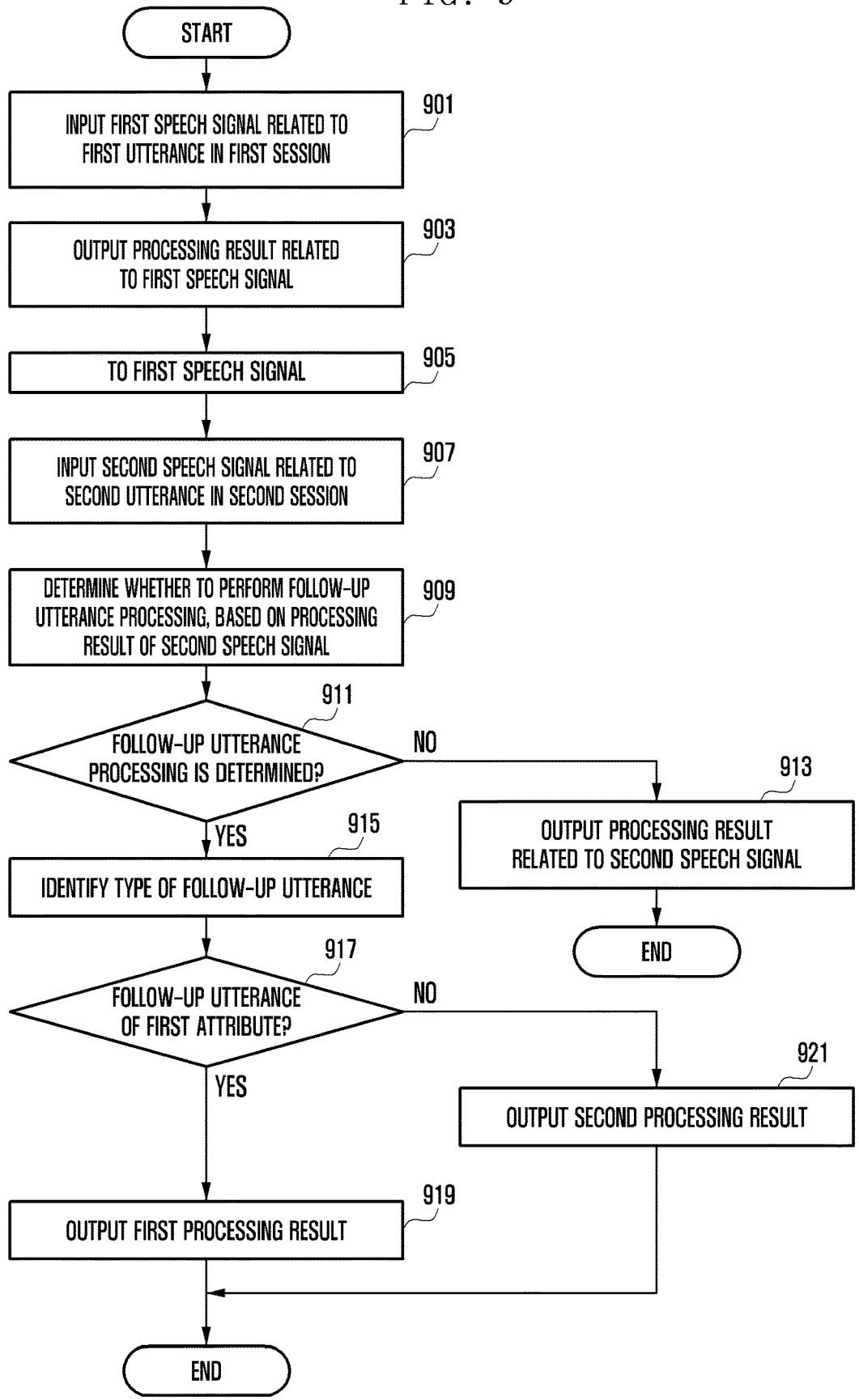
FIG. 9 is a flowchart illustrating an operation method of an electronic device according to an embodiment.

FIG. 9 is a flowchart illustrating an operation method of an electronic device according to an embodiment.

Referring to FIG. 9, in operation 901, the processor 120 of the electronic device 101 may receive a first speech signal (or audio stream) related to a first utterance in a first session. According to an embodiment, the processor 120 may receive a first speech signal corresponding to a first utterance of a user via a microphone (e.g., microphone 151 of FIG. 2) of the electronic device 101.

In operation 903, the processor 120 may output a processing result related to the first speech signal. According to an embodiment, the processor 120 may transmit the first speech signal of the first utterance to a server 600, and acquire a first response result generated via processing of the first utterance by the server 600. According to an embodiment, the processor 120 may provide the user with the first response result as visual information and/or auditory information on the basis of a designated output scheme.

In operation 905, the processor 120 may terminate the first session. According to an embodiment, after providing the first response result related to the first utterance, the processor 120 may manage the first session of the first utterance, and may terminate the first session when detected an appropriate and designated condition for termination. For example, according to an embodiment, the processor 120 may terminate the first session based on expiration of a session maintenance time of the first session, or in another alternative, upon detecting an explicit input of the user for canceling the first session.

In operation 907, the processor 120 may receive a second speech signal related to a second utterance, for processing in a second session. According to an embodiment, after the first session is terminated, the processor 120 may receive the second speech signal according to the second utterance of the user via the microphone (e.g., microphone 151 of FIG. 2) of the electronic device 101 in the second session, that is a new session distinct from the first session.

In operation 909, the processor 120 may determine whether to perform follow-up utterance processing on the second utterance, based on a processing result of the second speech signal. According to an embodiment, when a response result obtained by processing the second utterance is acquired, the processor 120 may determine whether a history of the first utterance (e.g., previous utterance) is extant. According to an embodiment, if the history related to the first utterance exists, the processor 120 may analyze the response result obtained by processing the second utterance, and determine whether the response result is an un-handled response result (e.g., response result of a first situation) obtained due to a recognition failure, or (e.g., response result of a second situation) obtained by erroneously processing the second utterance in a capsule other than the capsule in which the first utterance has been processed.

According to an embodiment, if the second response result is indicative of the first situation or the second situation, the processor 120 may determine to execute follow-up utterance processing for the second utterance. According to an embodiment, the processor 120 may determine to execute follow-up utterance processing, by referring to time information (e.g., termination time (e.g., timestamp) of the previous session) related to the previous utterance. For example, since follow-up utterance processing may be meaningless when a session termination time of the previous utterance exceeds (e.g., exceeding certain time limit based on a current utterance) a designated certain time (e.g., units of days, hours, or minutes), the processor 120 may determine to process the second utterance as a root utterance.

In operation 911, the processor 120 may determine, based on a determination result, whether to process the second utterance (e.g., current utterance) as a follow-up utterance or root utterance.

The processor 120 may output, in operation 913, a processing result related to the second speech signal, based on determination of processing the second utterance as a root utterance in operation 911 (e.g., "No" in operation 911).

The processor 120 may identify, in operation 915, a type (or attribute) of follow-up utterance processing, based on determination of processing the second utterance as the follow-up utterance in operation 911 (e.g., "Yes" in operation 911). According to an embodiment, the processor 120 may distinguish whether the response result is an un-handled result, or a result of processing via a different capsule (than the capsule used to process the first speech signal). According to an embodiment, the processor 120 determine to execute follow-up utterance processing of the first attribute in a case of an un-handled result (e.g., a recognition failure), and determine to execute follow-up utterance processing of the second attribute in a case of a processing result generated erroneously via a different capsule.

In operation 917, based on identification of the type of follow-up utterance processing, the processor 120 may determine whether the type of processing to execute is follow-up utterance processing of the first attribute, or follow-up utterance processing of the second attribute.

The processor 120 may output a first processing result in operation 919, based on determination to execute follow-up utterance processing of the first attribute in operation 917 (e.g., "Yes" in operation 917). According to an embodiment, the processor 120 may provide the user with one response result obtained by processing the second utterance as the follow-up utterance.

The processor 120 may output a second processing result in operation 921, based on determination to execute follow-up utterance processing of the second attribute in operation 917 (e.g., "No" in operation 917). According to an embodiment, the processor 120 may provide the user with two response results which are a response result obtained by processing the second utterance as the root utterance and a response result obtained by processing the second utterance as the follow-up utterance.

Figure 10:
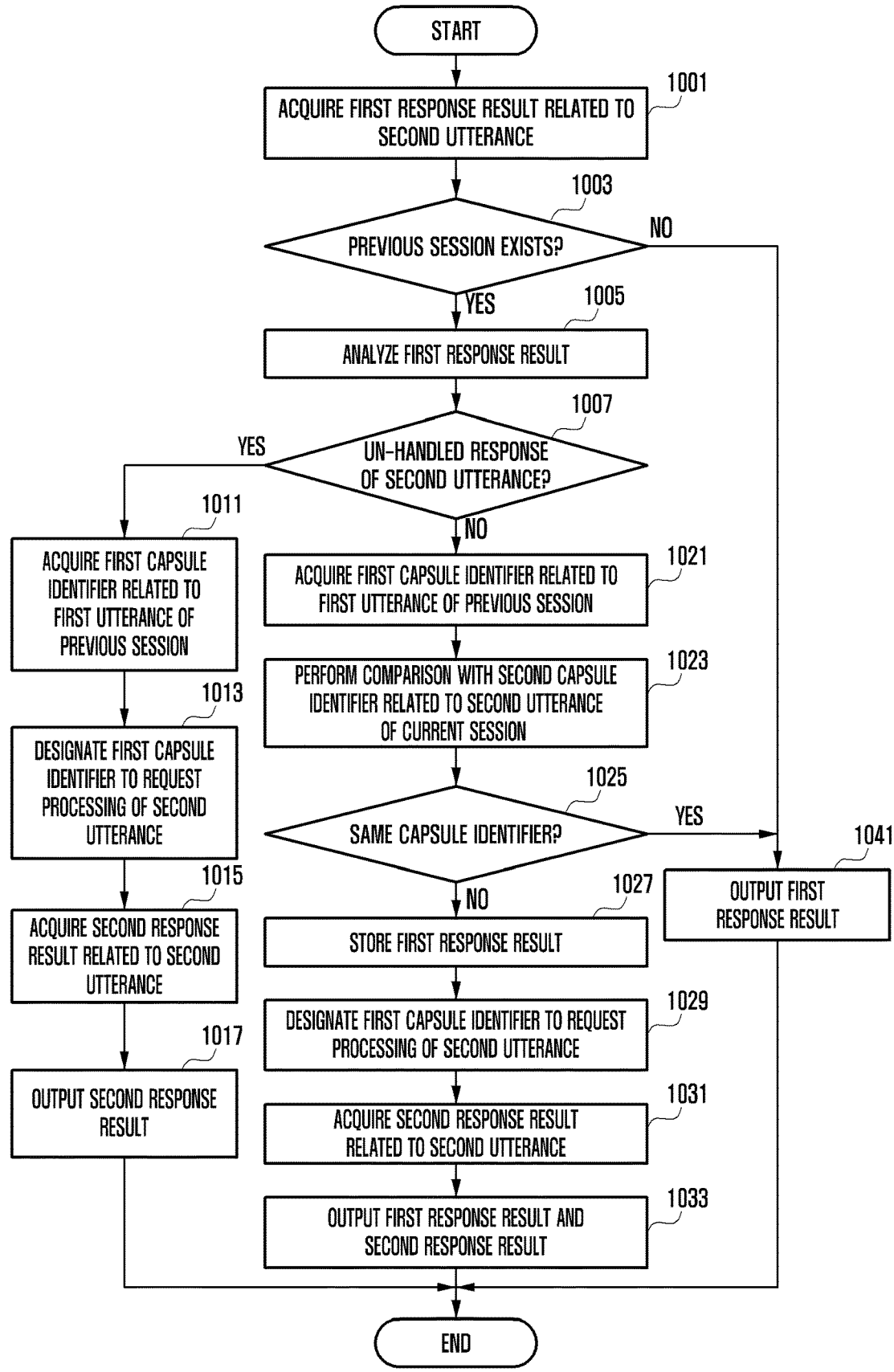
FIG. 10 is a flowchart illustrating an operation method of an electronic device according to an embodiment.

FIG. 10 is a flowchart illustrating an operation method of an electronic device according to an embodiment.

Referring to FIG. 10, in operation 1001, the processor 120 of the electronic device 101 may acquire a first response result related to a second utterance (e.g., current utterance). According to an embodiment, the processor 120 may acquire the first response result obtained by processing the second utterance by the server 600.

In operation 1003, the processor 120 may determine whether a previous session related to the user's utterance is extant, based on reception of the first response result. According to an embodiment, the processor 120 may determine whether a previous session is extant by analyzing a history related to the user's utterances. According to an embodiment, if a previous session exists, the processor 120 may determine whether to execute follow-up utterance processing, by referring to a termination time (e.g., timestamp) of the previous session.

If no previous session is determined to be extant in operation 1003 (e.g., "No" in operation 1003), the processor 120 may output the first response result and provide the same to the user in operation 1041. Furthermore, according to an embodiment, even if a previous session is extant, if a termination time of the previous session exceeds a predesignated time frame, the processor 120 may determine the second utterance as a root utterance and may immediately output the first response result.

If a previous session exists in operation 1003 (e.g., "Yes" in operation 1003), the processor 120 may analyze the first response result in operation 1005. According to an embodiment, the processor 120 may analyze a type of the first response result in order to determine whether the second utterance corresponds to a follow-up utterance, or to a root utterance, based on acquisition of the first response result.

In operation 1007, the processor 120 may determine, based on the analysis of the first response result, whether the first response result corresponds to an un-handled response due to a failure in recognition of the second utterance.

If the first response result is determined to be an un-handled response in operation 1007 (e.g., "Yes" in operation 1007), the processor 120 may acquire, in operation 1011, a first capsule identifier related to the first utterance of the previous session. According to an embodiment, the processor 120 may acquire the first capsule identifier which corresponds to a capsule in which the first utterance was processed in the preceding session, via analysis of the user history.

In operation 1013, the processor 120 may designate the first capsule identifier in requesting reprocessing of the second utterance. According to an embodiment, the processor 120 may request, while transferring the acquired first capsule identifier to the server 600, reprocessing of the second utterance from the server 600 on the basis of a capsule matching the first capsule identifier.

In operation 1015, the processor 120 may acquire a second response result related to the second utterance via the re-processing. According to an embodiment, the processor 120 may acquire the second response result obtained by second-processing the second utterance by the server 600 on the basis of the designated capsule (e.g., capsule of the first capsule identifier).

In operation 1017, the processor 120 may output the second response result and provide the same to the user.

If the second response result is not determined to be an un-handled response in operation 1007 (e.g., "No" in operation 1007), the processor 120 may acquire, in operation 1021, a first capsule identifier related to the first utterance of the previous session. According to an embodiment, the processor 120 may acquire the first capsule identifier which is indicative of a capsule used to process the first utterance of the previous session via analysis of the user history.

In operation 1023, the processor 120 may compare the first capsule identifier with a second capsule identifier related to the second utterance of a current session. According to an embodiment, the processor 120 may compare the first and second capsule identifiers to determine whether a different capsule was used to process the second utterance in generating the second response result.

In operation 1025, the processor 120 may determine, based on a comparison result, whether the first capsule identifier and the second capsule identifier are the same. According to an embodiment, the processor 120 may identify, based on comparison of the capsule identifiers, whether the capsule in which the second utterance has been processed is the same capsule as the capsule in which the first utterance has been processed.

If the capsule identifiers are the same capsule identifier in operation 1025 (e.g., "Yes" in operation 1025), for example, if the capsule in which the second utterance has been processed is the same capsule as the capsule in which the first utterance has been processed, and thus no re-processing is required. Thus, the processor 120 may output the first response result and provide the same to the user in operation 1041.

If the capsule identifiers are not the same capsule identifier in operation 1025 (e.g., "No" in operation 1025), this indicates that the capsule in which the second utterance is processed is different from the capsule in which the first utterance is been processed, the processor 120 may store and manage the first response result in operation 1027.

In operation 1029, the processor 120 may designate the first capsule identifier so as to request re-processing of the second utterance by the corresponding first capsule. According to an embodiment, the processor 120 may request, while transferring the acquired first capsule identifier to the server 600, reprocessing of the second utterance from the server 600 on the basis of the capsule of the first capsule identifier.

In operation 1031, the processor 120 may acquire a second response result related to the second utterance via the re-processing operation. According to an embodiment, the processor 120 may acquire the second response result obtained by second-processing the second utterance by the server 600 on the basis of the designated capsule (e.g., capsule of the first capsule identifier).

In operation 1033, the processor 120 may output the first response result and the second response result, and provide the same to the user. According to an embodiment, if the second response result obtained by reprocessing the second utterance on the basis of the designated capsule is acquired, the processor 120 may call the previously stored first response result and may output both the first response result and the second response result (e.g., in parallel or sequentially).

Figure 11:
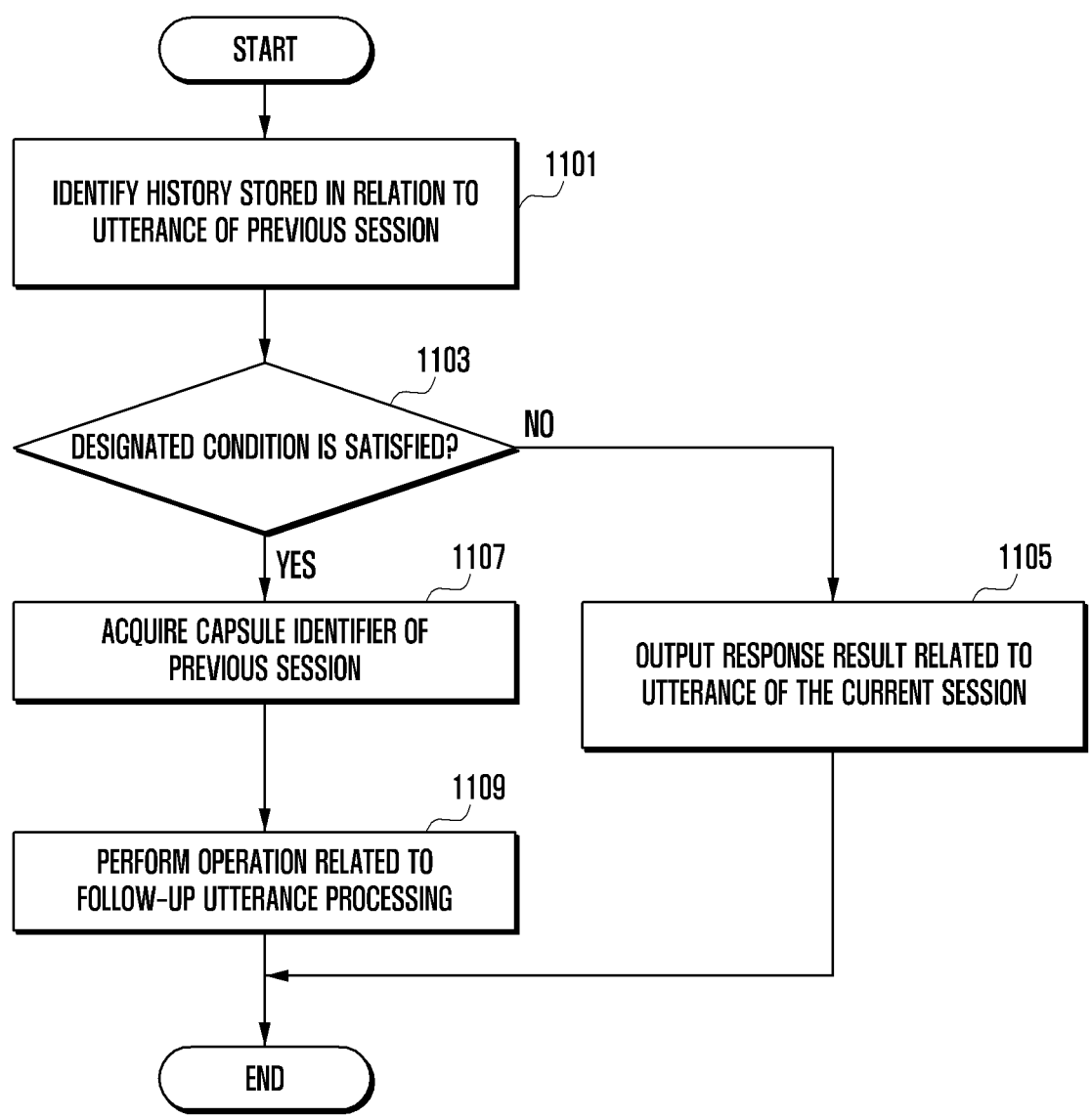
FIG. 11 is a flowchart illustrating an operation method of an electronic device according to an embodiment.

FIG. 11 is a flowchart illustrating an operation method of an electronic device according to an embodiment.

Referring to FIG. 11, in operation 1101, the processor 120 of the electronic device 101 may identify a history stored in relation to an utterance of a previous session. According to an embodiment, when a response result related to an utterance of a current session is acquired, the processor 120 may determine a history of utterance processing of the utterance (e.g., first utterance) of the previous session.

In operation 1103, the processor 120 may determine whether a designated condition is satisfied. According to an embodiment, the processor 120 may determine, based on history identification, whether a history related to the utterance of the previous session exists. If the history exists, the processor 120 may determine whether a termination time (e.g., timestamp) of the previous session is included within a predesignated time span. If the termination time is within the designated certain time, the processor 120 may determine whether a capsule identifier (e.g., capsule ID) in which the utterance of the previous session has been processed is recorded. If these conditions are met, the processor 120 may determine that the designated condition is satisfied.

If the designated condition is not satisfied in operation 1103 (e.g., "No" in operation 1103), the processor 120 may output a response result related to the utterance of the current session in operation 1105. According to an embodiment, the response result related to the utterance of the current session may include an un-handled result due to a recognition failure or a response result obtained by processing based on a capsule mapped for utterance processing of the current session.

If the designated condition is satisfied in operation 1103 (e.g., "Yes" in operation 1103), the processor 120 may acquire, in operation 1107, the capsule identifier which indicates a capsule by which the utterance of the previous session is processed.

In operation 1109, the processor 120 may perform an operation related to follow-up utterance processing for the utterance of the current session, based on the capsule identifier in which the utterance of the previous session has been processed. According to an embodiment, the processor 120 may process the utterance of the current session via the capsule designated based on the capsule identifier for processing of the utterance of the previous session, and may perform an operation related to providing of one or two corresponding response results.

Hereinafter, described is an example of processing an operation according to an embodiment of the disclosure in a single subject of the electronic device 101 or the server 600 (e.g., intelligent server 201 of FIG. 2).

According to an embodiment, the electronic device 101 may implement a speech recognition device (e.g., speech assistant) including, for example, an element for speech recognition processing in the server 600 as illustrated in FIG. 2, FIG. 6, or FIG. 7, and may operate in a manner of performing speech recognition processing standalone without interaction with the server 600.

According to another embodiment, the server 600 may implement a speech recognition device (e.g., speech assistant) including, for example, at least some elements (e.g., follow-up utterance decision module 540, history management module 550, and/or result management module 560) of the function processing module 500 as illustrated in FIG. 5, FIG. 6, or FIG. 7, and may operate in such a way of processing, in a standalone manner, a speech signal related to an utterance transferred from the electronic device 101, and providing a response result for follow-up utterance or root utterance processing to the electronic device 101.

Figure 12:
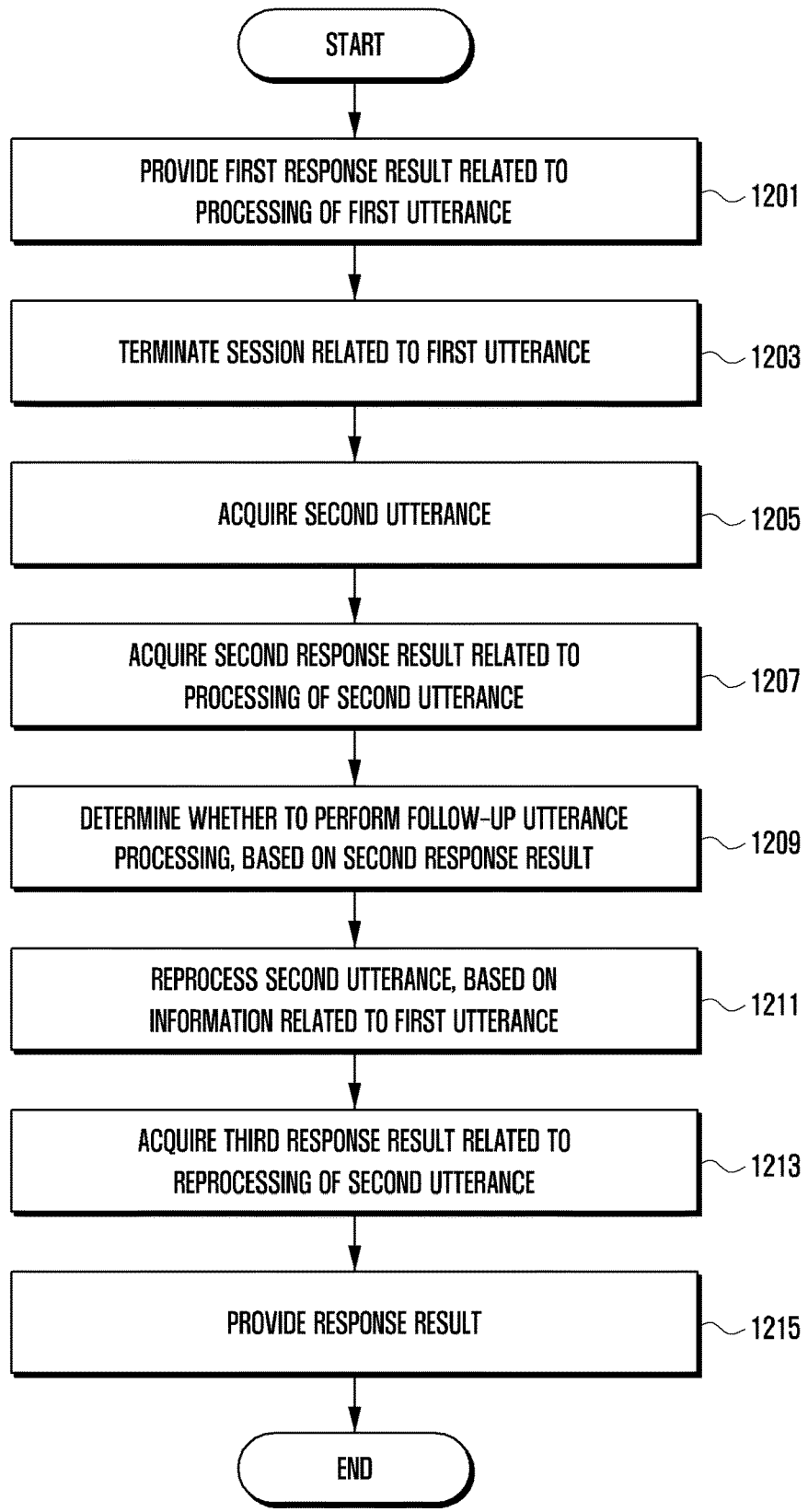
FIG. 12 is a flowchart illustrating an operation method of an electronic device or a server according to an embodiment.

According to certain embodiments, the speech recognition device (e.g., speech assistant) for follow-up utterance processing and speech recognition processing may be implemented as a hardware module or a software module so as to be implemented in the form mounted on the electronic device 101 or the server 600, and may process operations according to certain embodiments by one element (e.g., electronic device 101 or server 600) including the speech recognition device. FIG. 12 illustrates an operation example of the electronic device 101 or the server 600, which include a speech recognition device for supporting a speech recognition service, according to certain embodiments of the disclosure.

FIG. 12 is a flowchart illustrating an operation method of an electronic device or a server according to an embodiment.

According to an embodiment, in FIG. 12, a speech recognition device (e.g., elements of the function processing module 500 of FIG. 5 and the intelligent server 201 of FIG. 2) is implemented in the electronic device 101 or the server 600 and, accordingly, operations of the speech recognition device in the electronic device 101 or the server 600 may be illustrated.

Referring to FIG. 12, a speech recognition device (e.g., a processor configured to control operation of the speech recognition device) may be implemented as a hardware module or a software module in the electronic device 101 or the server 600. The speech recognition device may provide, in operation 1201, a first response result generated via processing of a first utterance. According to an embodiment, when operating in the electronic device 101, a speech recognition device may perform utterance processing for a first utterance-based speech signal (or audio stream) on the basis of a designated capsule in response to a first utterance input of a user, and then may output a first response result corresponding thereto. According to another embodiment, when operating in the server 600, a speech recognition device may receive the speech signal based on the first utterance from the electronic device 101, may perform utterance processing for the received speech signal on the basis of the designated capsule, and then may transmit, to the electronic device 101, the first response result corresponding there to.

In operation 1203, subsequently, the speech recognition device may terminate a session related to the first utterance. According to an embodiment, after providing the first response result related to the first utterance, the speech recognition device may manage the session of the first utterance, and may terminate the session, based on sensing of a designated condition for termination. According to an embodiment, the designated condition may be based on, for example, a designated session management policy. For example, the speech recognition device may terminate the session when a session maintenance time expires. As another example, the speech recognition device may terminate the session, based on disconnection of the session according to the user's explicit input (e.g., moving a home screen or terminating a speech assistant) from the electronic device 101.

In operation 1205, the speech recognition device may acquire a second utterance of the user after the session related to the first utterance is terminated. According to an embodiment, when operating in the electronic device 101, the speech recognition device may receive a second utterance input of the user via a microphone (e.g., microphone 151 of FIG. 2) of the electronic device 101. According to another embodiment, when operating in the server 600, the speech recognition device may receive a speech signal based on the second utterance from the electronic device 101.

In operation 1207, the speech recognition device may acquire a second response result related to processing of the second utterance. According to an embodiment, the speech recognition device may discover and map a capsule for processing of the second utterance, on the basis of reception of the second utterance, may process the second utterance via the mapped capsule, and may acquire the second response result corresponding thereto.

In operation 1209, the speech recognition device may determine, based on acquisition of the second response result, whether to execute follow-up utterance processing on the second utterance, based on the second response result. For example, the second utterance may be a follow-up utterance associated with the first utterance that is not processed by follow-up utterance processing. For example, the speech recognition device may determine, based on the second response result, whether to execute follow-up utterance processing on the second utterance. According to an embodiment, when the second response result obtained by processing the second utterance is acquired, the speech recognition device may determine a history of the first utterance (e.g., previous utterance).

According to an embodiment, if the history related to the first utterance is extant, the speech recognition device may analyze the second response result obtained by processing the second utterance, and may determine whether the response result is an un-handled response result (e.g., response result of a first situation) obtained due to a recognition failure (or capsule mapping failure), or is a response result (e.g., response result of a second situation) obtained by processing the second utterance in a capsule other than the capsule in which the first utterance has been processed.

According to an embodiment, if the second response result is a response result of the first situation or the second situation, the speech recognition device may determine follow-up utterance processing for the second utterance. According to an embodiment, the speech recognition device may determine follow-up utterance processing or root utterance processing for the second utterance by referring to time information (e.g., termination time of the previous session) related to the previous utterance. For example, since follow-up utterance processing may be meaningless if a session termination time of the previous utterance exceeds (e.g., exceeding certain time limit based on a current utterance) a designated certain time (e.g., units of days, hours, or minutes), the speech recognition device may determine to process the second utterance as a root utterance.

In operation 1211, based on a determination to execute follow-up utterance processing for the second utterance, the speech recognition device may reprocess the second utterance based on a capsule identifier (e.g., capsule ID) related to the first utterance. According to an embodiment, when follow-up utterance processing is determined, the speech recognition device may acquire a capsule identifier (e.g., capsule ID) in which the first utterance that is the previous utterance has been processed, and may reprocess the second utterance on the basis of a capsule of the capsule identifier. According to an embodiment, the speech recognition device may map and manage various information (e.g., user utterance, session information, a capsule identifier of a capsule in which the user utterance is processed, and/or information on time at which the user utterance is processed) related to utterance processing for a user utterance.

In operation 1213, the speech recognition device may acquire a third response result based on the reprocessing of the second utterance, executed using the designated capsule. According to an embodiment, the speech recognition device may process the second utterance via the designated capsule (e.g., capsule corresponding to the capsule identifier in which the first utterance has been processed) for processing the second utterance, and may acquire the third response result corresponding thereto.

In operation 1215, the speech recognition device may provide the third response result. According to an embodiment, the speech recognition device may provide the third response result that is a result of processing the second utterance as a follow-up utterance. According to an embodiment, the speech recognition device may provide both of the second response result that is a result of processing the second utterance as the root utterance and the third response result that is a result of processing the second utterance as the follow-up utterance. According to an embodiment, when operating in the electronic device 101, the speech recognition device may provide the third response result or provide the second response result and the third response result via the display module 160 and/or a speaker (e.g., speaker 155 of FIG. 2) of the electronic device 101. According to another embodiment, when operating in the server 600, the speech recognition device may transmit the third response result or transmit the second response result and the third response result to the electronic device 101.

Figure 13:
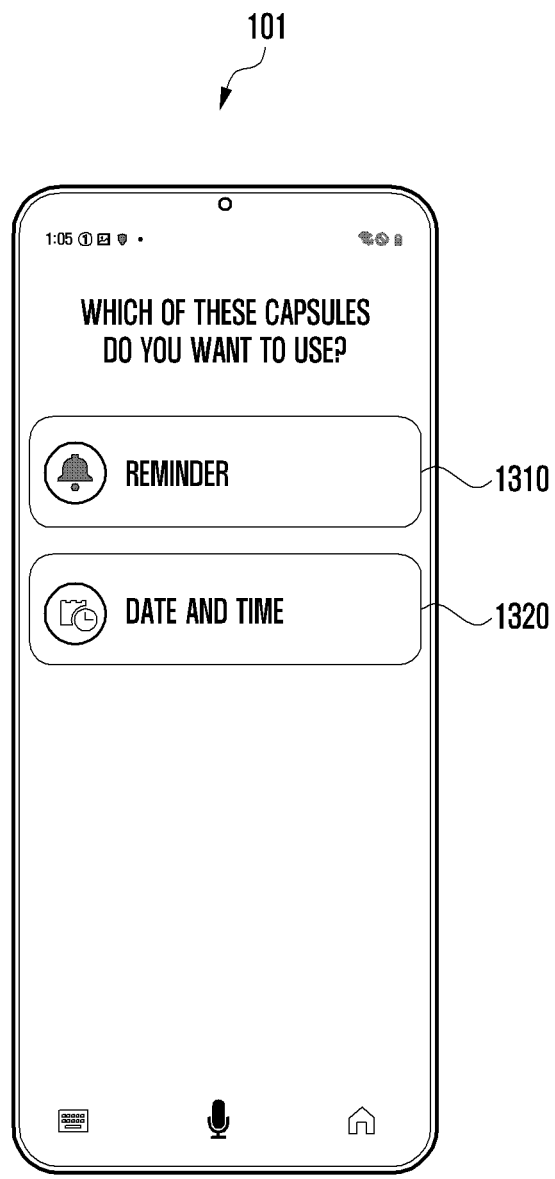
FIG. 13 is a diagram illustrating an example of providing a result of follow-up utterance processing in an electronic device according to an embodiment.

FIG. 13 is a diagram illustrating an example of providing a result of follow-up utterance processing in an electronic device according to an embodiment.

According to an embodiment, FIG. 13 illustrates an example of a result obtained by processing an utterance in a new current session as a follow-up utterance subsequent to an utterance of a previous session, after session termination.

For example, a user may generate a first speech-based input: "Make a reminder to go shopping tomorrow at 5 o'clock" which may then be processed according to a previous session. After this previous session is terminated, the user may input a subsequent user utterance of "Change it to 6 o'clock" in the new current session. In this case, the utterance in the previous session may be processed in a reminder capsule, and the utterance in the new current session may be processed in a date and time capsule different from the reminder capsule. In this case, the user may be provided with a first response result, which is obtained by processing the user utterance in the current session as a follow-up utterance subsequent to the utterance of the previous session in the reminder capsule that is a capsule of the previous session, and a second response result obtained by processing the utterance in the current session as a root utterance in the date and time capsule.

According to an embodiment, FIG. 13 may illustrate an example of providing both of a first response result 1310 (e.g., a response result obtained by processing the user utterance as the follow-up utterance in the reminder capsule), which is obtained by processing the utterance of the current session as the follow-up utterance by designating a capsule in which the utterance of the previous session has been processed, and a second response result 1320 (e.g., a response result obtained by processing the same user utterance as the root utterance in the date and time capsule) obtained by processing the utterance of the current session as the root utterance. According to an embodiment, in consideration of the root utterance intended by the user, the electronic device 101 may provide both response results, such as the second response result 1320 obtained by processing as the root utterance and the first response result 1310 obtained by processing as the follow-up utterance, so as to allow the user to select the correct result that accords with their original intent for the input.

Figure 14A:
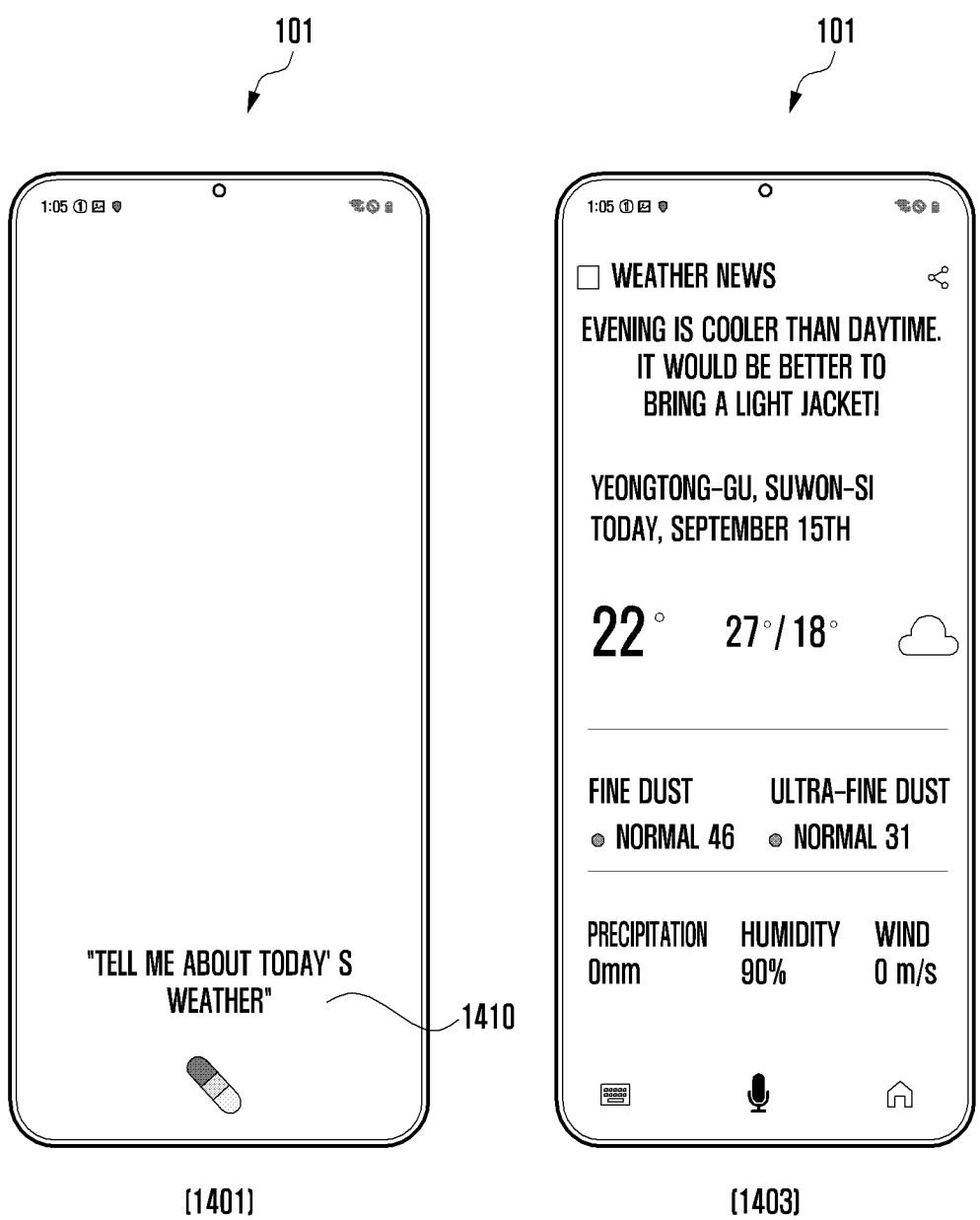
FIG. 14A and FIG. 14B are diagrams for illustrating examples of result screens that the electronic device provides after processing an utterance subsequent to session termination as a follow-up utterance according to an embodiment.
Figure 14B:
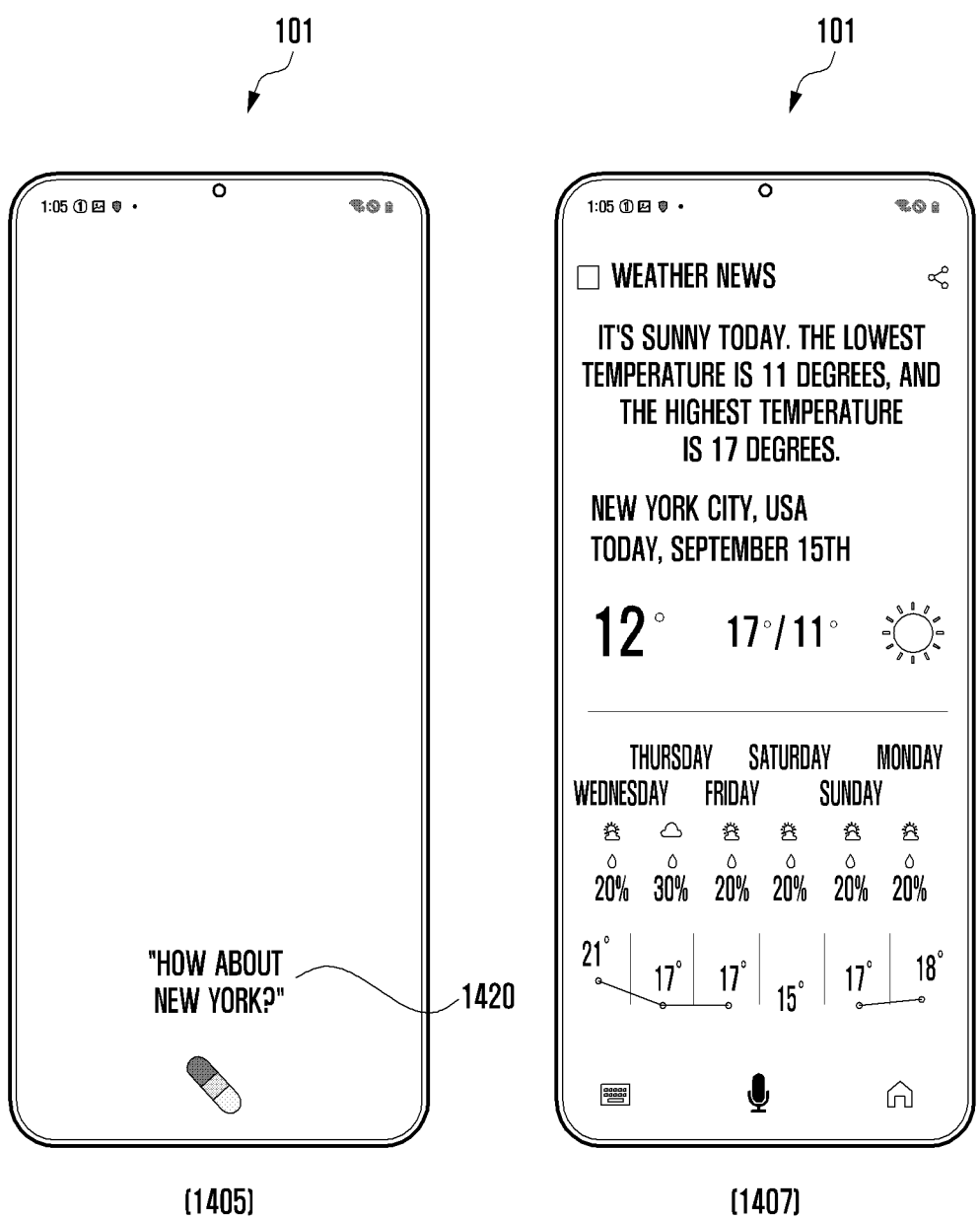

FIG. 14A and FIG. 14B are diagrams for illustrating examples of result screens provided by processing an utterance after session termination as a follow-up utterance in an electronic device according to an embodiment.

According to an embodiment, FIG. 14A and FIG. 14B may show examples of, if recognition of a user's utterance (e.g., second utterance 1420) fails in a new session subsequent to session termination (e.g., capsule mapping failure or mis-processing) (e.g., first situation), processing and providing the user's utterance as a follow-up utterance.

Referring to FIG. 14A, FIG. 14A may show an example of providing a first response result corresponding to a first utterance 1410 of a user in a first session. According to an embodiment, in example screen 1401, the electronic device 101 may execute a speech assistant and acquire the first utterance 1410 (e.g., "Tell me about today's weather") from the user. According to an embodiment, example screen 1403 may illustrate an example in which the electronic device 101 provides (e.g., displays) the first response result obtained by processing the first utterance 1410. For example, the electronic device 101 may output a result screen obtained by processing the first utterance 1410 by using a designated capsule (e.g., weather capsule).

Referring to FIG. 14B, FIG. 14B may show an example of providing, after the first session is terminated, a second response result corresponding to a second utterance 1420 of the user in a new second session. According to an embodiment, in example screen 1405, the electronic device 101 may execute the speech assistant and acquire the second utterance 1420 (e.g., "How about New York?") from the user.

Here, FIG. 14B may illustrate as result of failure (or capsule mapping failure or mis-processing) in recognition of the second utterance 1420 of the user, and re-processing (e.g., follow-up utterance processing) the second utterance 1420 of the second session in the designated capsule (e.g., weather capsule), in which the first utterance 1410 of the first session has been processed, so as to provide (e.g., screen display) a result. For example, as illustrated in example screen 1407, when initial recognition failed for the second utterance 1420 of the second session subsequent to termination of the first session, a response result corresponding to processing based on successful recognition may be provided, without immediately notifying a user that a recognition failure occurred.

Figure 15:
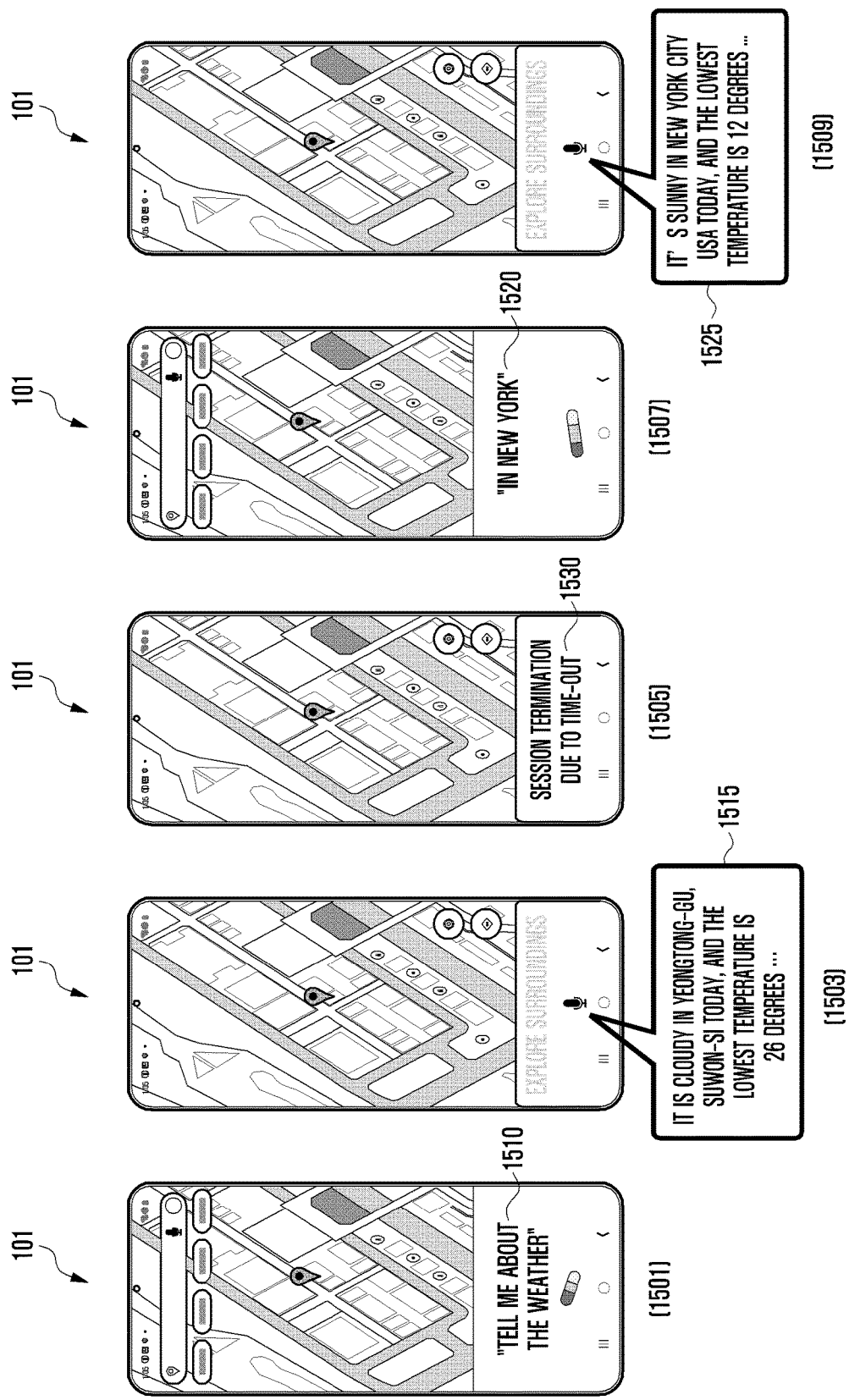
FIG. 15 shows diagrams for illustrating examples of result screens that the electronic device provides after processing an utterance subsequent to session termination as a follow-up utterance according to an embodiment.

FIG. 15 shows diagrams for illustrating examples of result screens that the electronic device provides after processing an utterance subsequent to session termination as a follow-up utterance according to an embodiment.

According to an embodiment, FIG. 15 may show an example of, if recognition of a user's utterance (e.g., second utterance 1520) fails in a new session subsequent to session termination (e.g., capsule mapping failure or mis-processing) (e.g., first situation), processing and providing the user's utterance as a follow-up utterance.

Referring to FIG. 15, example screen 1501 and example screen 1503 may show examples of providing a first response result, based on a first utterance 1510 of a user in a first session. According to an embodiment, in example screen 1501, the electronic device 101 may execute a speech assistant and acquire the first utterance 1510 (e.g., "Tell me about the weather") from the user. According to an embodiment, example screen 1503 may show an example in which the electronic device 101 provides (e.g., TTS-produces), as audio, a first response result 1515 obtained by processing the first utterance 1510. For example, the electronic device 101 may reproduce the first response result 1515 (e.g., It is cloudy in Yeongtong-gu, Suwon-si today, and the lowest temperature is 26 degrees . . . ) as audio in a driving mode and may output the same via a speaker (e.g., speaker 155 of FIG. 2).

According to an embodiment, example screen 1505 may illustrate an example in which the electronic device 101 provides the first response result 1515 for the first utterance 1510, and then automatically terminates the first session after a designated time (e.g., M seconds). According to an embodiment, the electronic device 101 may provide, based on termination of the first session, an output prompt 1530 according to session termination, as visual information (e.g., text of "session termination due to time-out") and/or auditory information (e.g., audio of "session termination due to time-out").

According to an embodiment, example screen 1507 and example screen 1509 may show an example of providing a second response result corresponding to a second utterance 1520 of the user in a new second session, after the first session is terminated. According to an embodiment, in example screen 1507, the electronic device 101 may execute the speech assistant and may receive the second utterance 1520 (e.g., "in New York") from the user.

Here, example screen 1507 and example screen 1509 may illustrate a case of a failure (or capsule mapping failure or mis-processing) in recognition of the second utterance 1520 of the user. Accordingly (although not illustrate), the device may execute re-processing (e.g., follow-up utterance processing) the second utterance 1520 of the second session in the designated capsule (e.g., weather capsule) in which the first utterance 1510 of the first session has been processed, so as to provide (e.g., TTS-produce) a result as audio. For example, as illustrated in example screen 1509, when initial recognition fails of the second utterance 1520 of the second session subsequent to termination of the first session, a response result 1525 of a recognition success resulted by follow-up utterance processing may be provided, without immediately notifying a user that a recognition failure occurred. For example, the electronic device 101 may reproduce the second response result 1525 (e.g., It's sunny in New York City today, and the lowest temperature is 12 degrees . . . ) as audio in the driving mode and may output the same via a speaker (e.g., speaker 155 of FIG. 2).

Figure 16A:
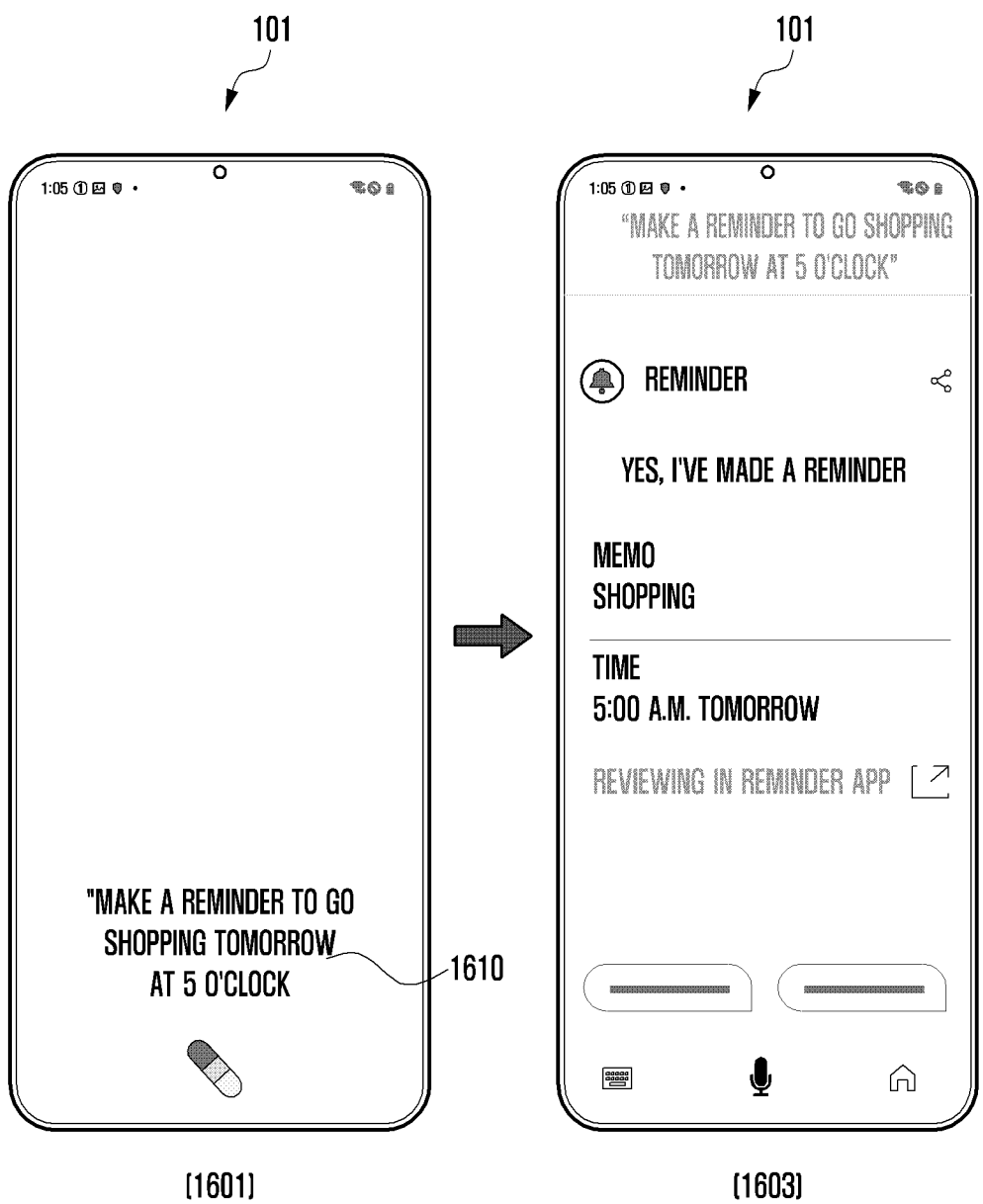
FIG. 16A and FIG. 16B are diagrams for illustrating examples of result screens that the electronic device provides after processing, as a follow-up utterance, an utterance subsequent to session termination by using a designated capsule according to an embodiment.
Figure 16B:
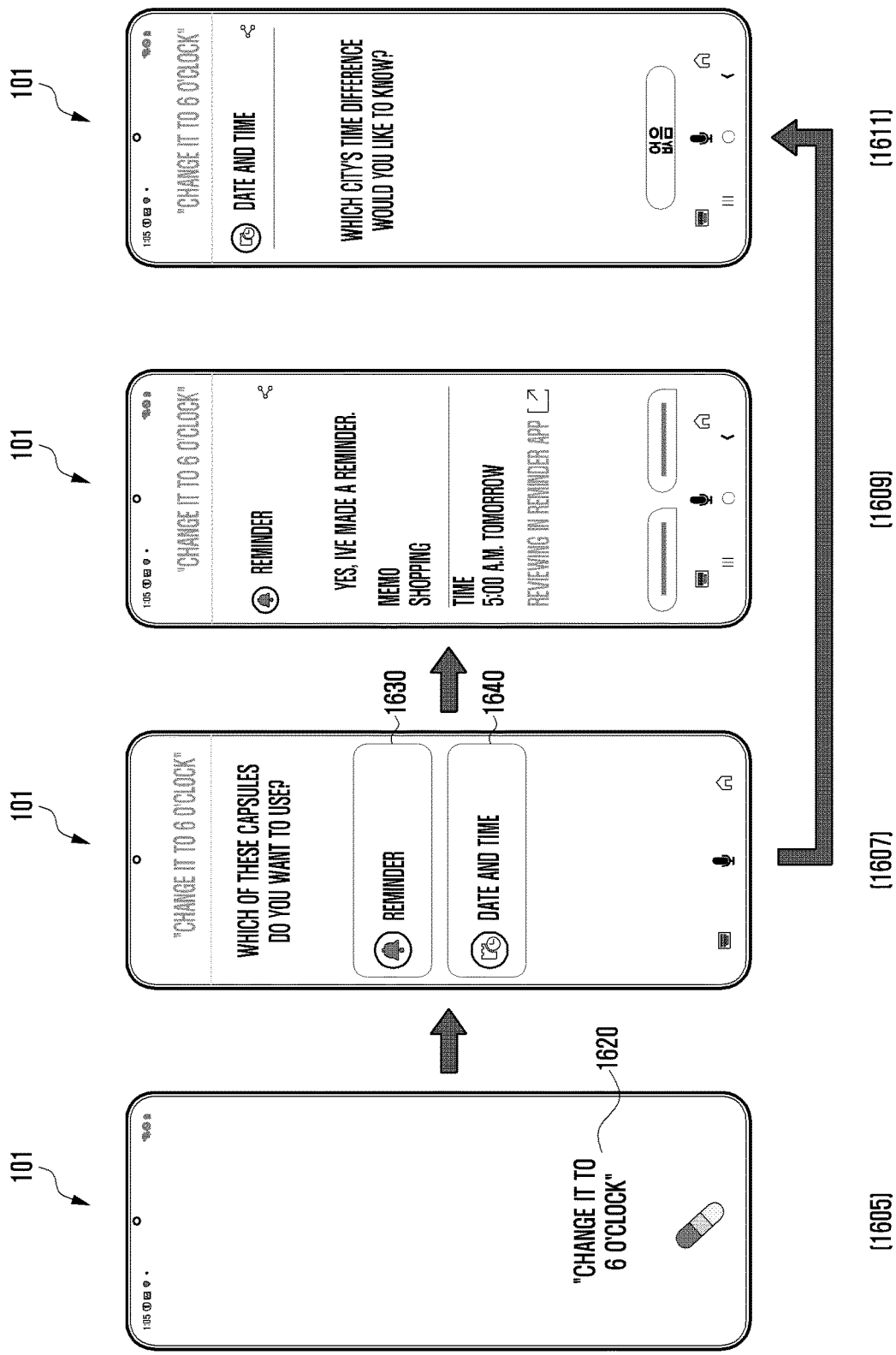

FIG. 16A and FIG. 16B are diagrams for illustrating examples of result screens that the electronic device provides after processing, as a follow-up utterance, an utterance subsequent to session termination by using a designated capsule according to an embodiment; and According to an embodiment, FIG. 16A and FIG. 16B may show examples of, in a case (e.g., second situation) where a capsule, in which a user's utterance (e.g., second utterance 1620) in a new session subsequent to session termination is processed, is processed by a capsule different from that in which an utterance (e.g., first utterance 1610) of a previous session has been processed, processing and providing the user's utterance as a follow-up utterance.

Referring to FIG. 16A, FIG. 16A may show an example of providing a first response result corresponding to a first utterance 1610 of a user in a first session. According to an embodiment, in example screen 1601, the electronic device 101 may execute a speech assistant and may acquire the first utterance 1610 (e.g., "Make a reminder to go shopping tomorrow at 5 o'clock") from the user. According to an embodiment, example screen 1603 may illustrate an example in which the electronic device 101 provides (e.g., displays) the first response result obtained by processing the first utterance 1610. For example, the electronic device 101 may provide a result screen obtained by processing the first utterance 1610 in a designated capsule (e.g., reminder capsule).

Referring to FIG. 16B, FIG. 16B may illustrate an example of providing, after the first session is terminated, a response result corresponding to a second utterance 1620 of the user in a new second session. According to an embodiment, in example screen 1605, the electronic device 101 may execute the speech assistant and may acquire the second utterance 1620 (e.g., "Change it to 6 o'clock") from the user.

Here, FIG. 16B may show an example of, when the user's second utterance 1620 is processed as a root utterance by a capsule (e.g., date and time capsule) different from a capsule (e.g., reminder capsule) in which the first utterance 1610 has been processed, the device may execute re-processing (e.g., follow-up utterance processing) of the second utterance 1620 of the second session by the designated capsule (e.g., reminder capsule) in which the first utterance 1610 of the first session has been processed, and output (e.g., screen displaying) both of a second response result 1630 obtained according to follow-up utterance processing, and a third response result 1640 obtained according to root utterance processing. For example, as illustrated in example screen 1607, with respect to the second utterance 1620 of the second session subsequent to termination of the first session, the capsule (e.g., reminder capsule) in which the first utterance 1610 of the first session has been processed may be designated, so that the second respond result 1630, which is obtained by processing the second utterance 1620 of the second session as the follow-up utterance on the basis of the designated capsule (e.g., reminder capsule), and the third respond result 1640, which is obtained by processing the second utterance 1620 of the second session as the root utterance on the basis of the mapped capsule (e.g., date and time capsule), may be provided together.

According to an embodiment, in consideration of the user intended root utterance, the electronic device 101 may provide both of two response results, such as the third response result 1640 obtained by processing as the root utterance and the second response result 1630 obtained by processing as the follow-up utterance, so as to allow the user to select the correct interpretation of the second utterance 1620.

According to an embodiment, example screen 1609 may illustrate an example of a result screen in a case where the user selects, in example screen 1607, the second response result 1630 obtained by processing as the follow-up utterance (e.g., processing based on the reminder capsule that is the designated capsule). As illustrated in example screen 1609, the electronic device 101 may provide (e.g., display) a response result obtained by processing the second utterance 1620 as the follow-up utterance by the reminder capsule in which the first utterance 1610 has been processed.

According to an embodiment, example screen 1611 may illustrate an example of a result screen in a case where the user selects, in example screen 1607, the third response result 1640 obtained by processing as the root utterance (e.g., processing based on the date and time capsule that is the mapped capsule). As illustrated in example screen 1611, the electronic device 101 may provide (e.g., display) a response result obtained by processing the second utterance 1620 as the root utterance by the date and time capsule.

Figure 17A:
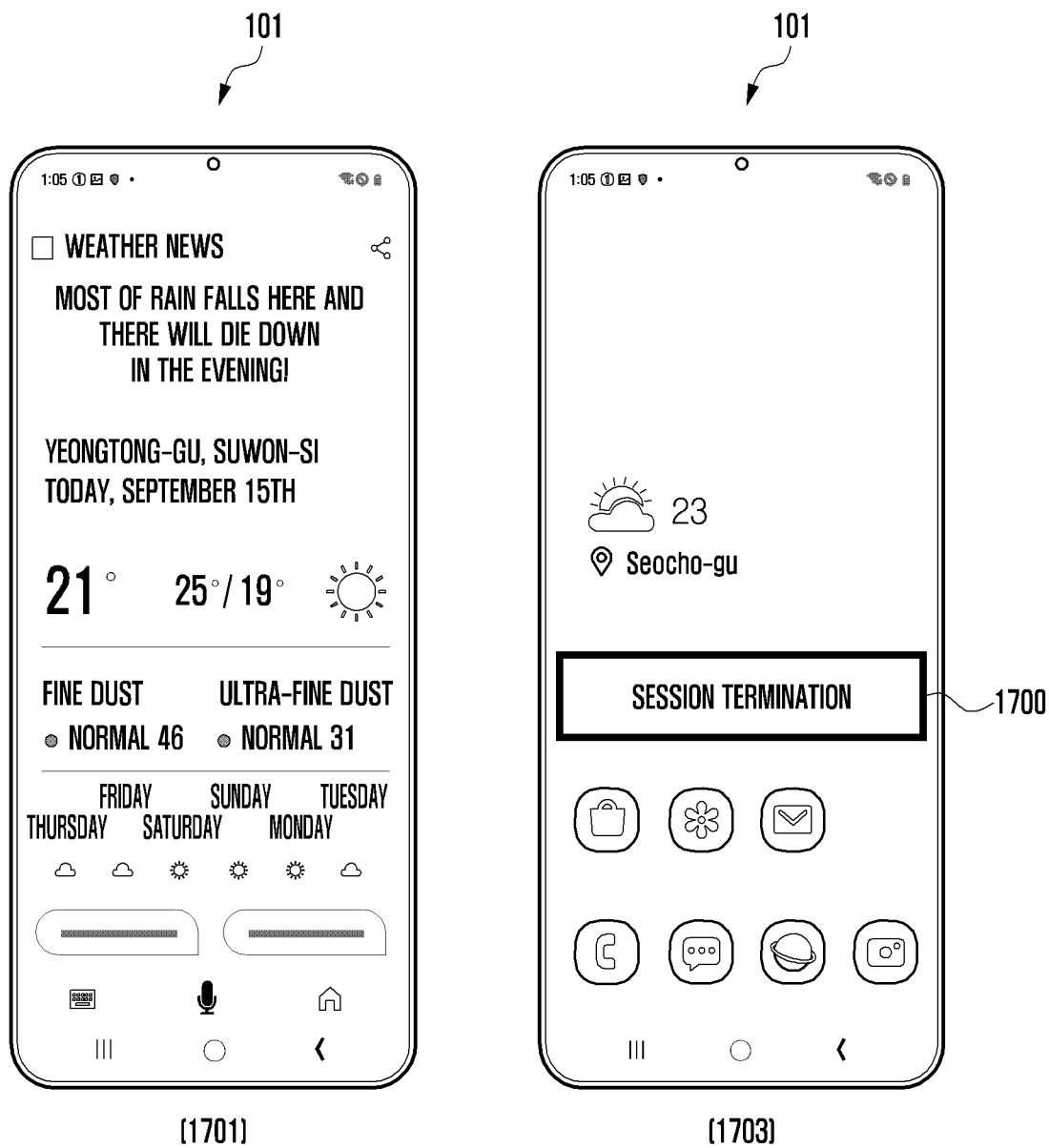
FIG. 17A and FIG. 17B are diagrams for illustrating examples of result screens that the electronic device provides after processing, as a follow-up utterance, an utterance subsequent to session termination by using a designated capsule according to an embodiment.
Figure 17B:
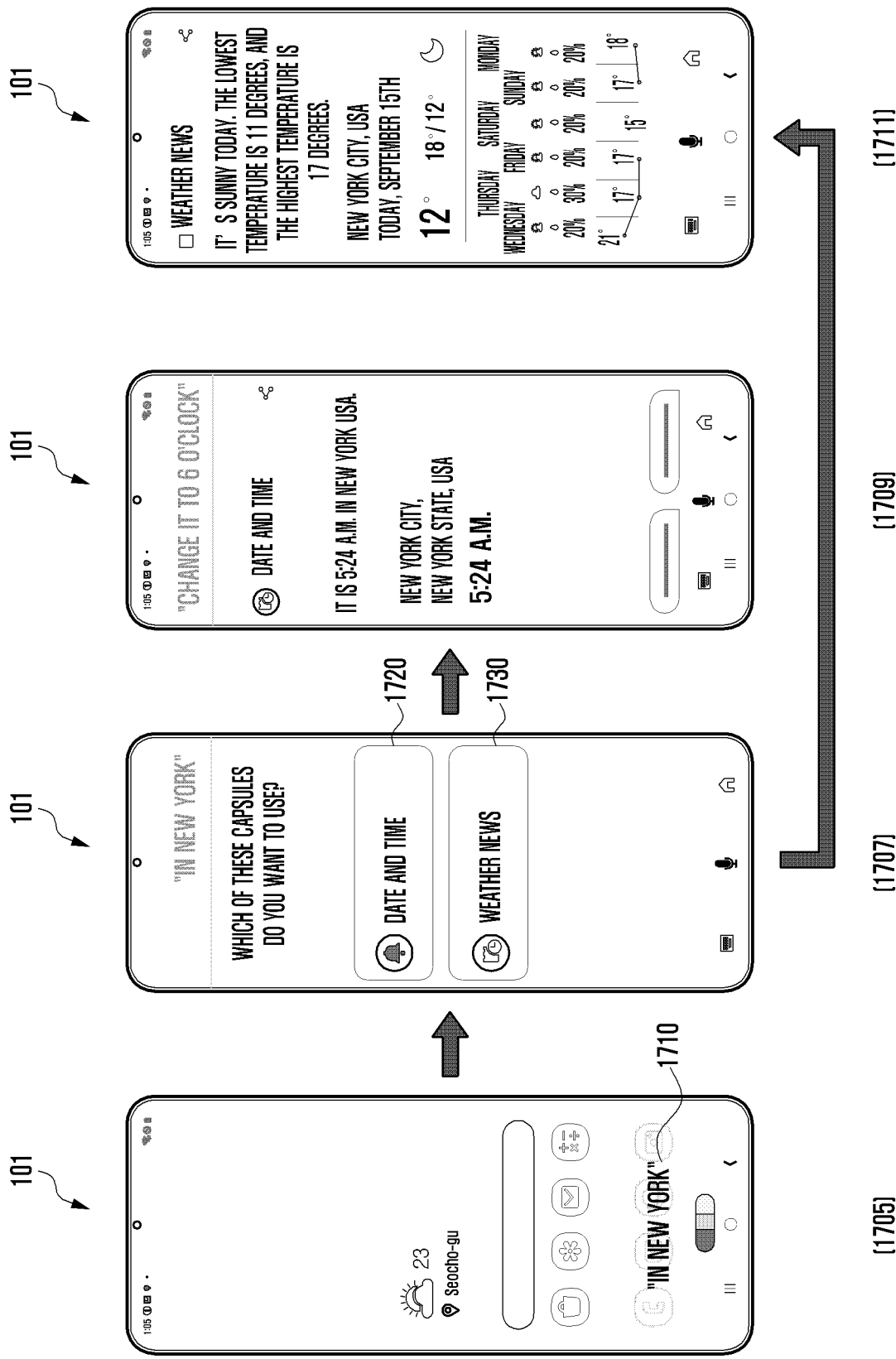

FIG. 17A and FIG. 17B are diagrams for illustrating examples of result screens that the electronic device provides after processing, as a follow-up utterance, an utterance subsequent to session termination by using a designated capsule according to an embodiment.

According to an embodiment, FIG. 17A and FIG. 17B may illustrate examples of, in a case (e.g., second situation) where a capsule, in which a user's utterance (e.g., second utterance 1710) in a new session subsequent to session termination is processed, is processed by a capsule different from that in which an utterance (e.g., first utterance) of a previous session (e.g., first utterance) has been processed, processing and providing the user's utterance as a follow-up utterance.

Referring to FIG. 17A, FIG. 17A may illustrate an example of providing a first response result corresponding to a first utterance of a user in a first session and then terminating the first session. According to an embodiment, example screen 1701 may show an example in which the user electronic device 101 provides (e.g., displays) the first response result obtained by processing the first utterance of the user. For example, the electronic device 101 may provide a result screen obtained by processing the first utterance by a designated capsule (e.g., date and time capsule).

According to an embodiment, example screen 1703 may illustrate an example of, after providing the first response result for the first utterance, terminating the first session on the basis of the user's explicit input (e.g., moving a home screen or terminating the speech assistant). According to an embodiment, the electronic device 101 may provide, based on termination of the first session, an output prompt 1700 according to session termination, as visual information (e.g., text of "session termination") and/or auditory information (e.g., audio of "session termination).

Referring to FIG. 17B, FIG. 17B may show an example of providing, after the first session is terminated, a response result corresponding to a second utterance 1710 of the user in a new second session. According to an embodiment, in example screen 1705, the electronic device 101 may execute the speech assistant and may acquire the second utterance 1710 (e.g., "in New York") from the user.

Here, FIG. 17B may show an example of, in a case where the user's second utterance 1710 is processed as a root utterance by a capsule (e.g., weather news capsule) different from the capsule (e.g., date and time capsule) in which the first utterance has been processed, then the device may execute reprocessing (e.g., follow-up utterance processing) the second utterance 1710 of the second session by the designated capsule (e.g., date and time capsule) in which the first utterance of the first session has been processed, and providing (e.g., screen displaying) both of a second response result 1720 according to follow-up utterance processing and a third response result 1730 according to root utterance processing.

For example, as illustrated in example screen 1707, with respect to the second utterance 1710 of the second session subsequent to termination of the first session, the capsule (e.g., date and time capsule) in which the first utterance of the first session has been processed may be designated, so that the second respond result 1720, which is obtained by processing the second utterance 1710 of the second session as the follow-up utterance on the basis of the designated capsule (e.g., date and time capsule), and the third respond result 1730, which is obtained by processing the second utterance 1710 of the second session as the root utterance on the basis of the mapped capsule (e.g., weather news capsule), may be provided together.

According to an embodiment, in consideration of the user intended root utterance, the electronic device 101 may provide both of two response results, such as the third response result 1730 obtained by processing as the root utterance and the second response result 1720 obtained by processing as the follow-up utterance, so as to allow the user to select the correct interpretation result of their utterance.

According to an embodiment, example screen 1709 may show an example of a result screen in a case where the user selects, in example screen 1707, the second response result 1720 obtained by processing as the follow-up utterance (e.g., processing based on the date and time capsule that is the designated capsule). As illustrated in example screen 1709, the electronic device 101 may provide (e.g., display) a response result obtained by processing the second utterance 1710 as the follow-up utterance by the date and time capsule in which the first utterance has been processed.

According to an embodiment, example screen 1711 may show an example of a result screen in a case where the user selects, in example screen 1707, the third response result 1730 obtained by processing as the root utterance (e.g., processing based on the weather news capsule that is the mapped capsule). As illustrated in example screen 1711, the electronic device 101 may provide (e.g., display) a response result obtained by processing the second utterance 1710 as the root utterance by the date and time capsule.

An operation method performed by the electronic device 101 according to an embodiment of the disclosure may include providing a first response result related to a first utterance of a user, which is input via a microphone (e.g., microphone 151 of FIG. 2), terminating a session related to the first utterance, acquiring, after the session related to the first utterance is terminated, a speech signal according to a second utterance of the user, which is input via the microphone, acquiring a second response result related to processing of the second utterance, determining, based on the second response result, whether to perform follow-up utterance processing on the second utterance, reprocessing the second utterance by designating information related to the first utterance on the basis of determining of the follow-up utterance processing, acquiring a third response result related to reprocessing of the second utterance, and providing one or two response results on the basis of attributes of performing follow-up utterance processing on the second utterance.

According to an embodiment, the determining of whether to perform follow-up utterance processing may include determining a history related to the first utterance, based on acquisition of the second response result, analyzing the second response result obtained by processing the second utterance if the history related to the first utterance exists, and determining whether to perform the follow-up utterance processing, based on a result of analyzing the second response result.

According to an embodiment, the determining of whether to perform follow-up utterance processing may include, if the history related to the first utterance exists, determining follow-up utterance processing or root utterance processing for the second utterance by referring to a termination time of the session.

According to an embodiment, the determining of whether to perform follow-up utterance processing may include, if the second response result is a response result of a first situation due to a failure in recognition of the second utterance, or if the second response result is a response result of a second situation in which the second utterance is processed in a second capsule differing from the first capsule in which the first utterance has been processed, determining follow-up utterance processing for the second utterance.

According to an embodiment, the reprocessing of the second utterance may include acquiring a capsule identifier of the first capsule in which the first utterance has been processed, based on determining of processing the second utterance as the follow-up utterance, designating the capsule for reprocessing of the second utterance, as the first capsule of the acquired capsule identifier, and reprocessing the second utterance on the basis of the designated first capsule.

According to an embodiment, the providing of the response results may include, when determining follow-up utterance processing on the basis of the response result of the first situation, providing the third response result obtained according to follow-up utterance processing for the second utterance, and when determining follow-up utterance processing on the basis of the response result of the second situation, providing the second response result obtained according to root utterance processing for the second utterance and the third response result obtained according to follow-up utterance processing for the second utterance.

The certain embodiments of the disclosure disclosed in the specification and drawings are merely specific examples to easily explain the technical content of the disclosure and to help understanding the disclosure, and are not intended to limit the scope of the disclosure. Therefore, the scope of the disclosure should be interpreted to include all modifications or modified forms derived based on the technical scope of the disclosure, in addition to the embodiments disclosed herein.

The invention claimed is:

1. A device for supporting a speech recognition service, the device comprising:
a memory; and
speech recognition circuitry operatively connected to the memory, wherein the speech recognition circuitry is configured to:
receive a first utterance, and process the first utterance to initiate a session and generate a first response result;
after the session related to the first utterance is terminated, receive a second utterance;
process the second utterance to generate a second response result;
based on the second response result, determine whether to execute follow-up utterance processing on the second utterance;
based on determining to execute the follow-up utterance processing, reprocess the second utterance based at least in part on the first response result related to the first utterance to generate a third response result; and
output the third response result.

2. The device of claim 1, wherein processing the first utterance includes initiating the session,
wherein the first utterance is processed according to a first capsule in the session, and
wherein the speech recognition circuitry is further configured to:
after processing the first utterance according to the first capsule, output the generated first response result using a predesignated scheme, and terminate the session based on detecting a termination condition related to the session of the first utterance.

3. The device of claim 2, wherein the speech recognition circuitry is further configured to:
map a capsule for processing the second utterance, and process the second utterance based at least in part on the mapped capsule.

4. The device of claim 3, wherein the speech recognition circuitry is further configured to:
determine whether a history related to the first utterance is extant upon generating the second response result, and
based on detecting that the history is extant, analyze the second response result to determine whether to execute the follow-up utterance processing on the second utterance.

5. The device of claim 4, wherein determining whether to execute the follow-up processing is further based on a termination time of the session.

6. The device of claim 3, wherein the speech recognition circuitry is configured to determine to execute the follow-up processing based on at least one of:
detecting a first situation including a recognition failure pertaining to processing of the second utterance, or
detecting a second situation in which the second utterance is processed in a second capsule different from the first capsule in which the first utterance is processed.

7. The device of claim 6, wherein the speech recognition circuitry is configured to:
based on determining to execute follow-up utterance processing for the second utterance, acquire a capsule identifier of the first capsule in which the first utterance is processed,
wherein mapping the capsule for processing the second utterance includes designating the first capsule corresponding to the acquired capsule identifier for reprocessing of the second utterance.

8. The device of claim 6, wherein:
when the first situation is detected, the third response result is generated via the follow-up utterance processing on the second utterance, and
when the second situation is detected, the second response result is generated via root utterance processing on the second utterance, and the third response result is generated via follow-up utterance processing on the second utterance.

9. An electronic device, comprising:
communication circuitry;
a display;
a microphone;
a memory; and
at least one processor, configured to:
receive a first utterance via the microphone, and process the first utterance to initial a session and generate a first response result;
after terminating the session related to the first utterance, receive a second utterance via the microphone;
process the second utterance to generate a second response result;
based on the second response result, determine whether to execute follow-up utterance processing on the second utterance;
based on determine to execute the follow-up utterance processing, reprocess the second utterance based at least in part on the first response result related to the first utterance to generate a third response result; and
output the third response result.

10. The electronic device of claim 9, wherein the at least one processor is further configured to:
determine whether a history related to the first utterance is extant upon generating the second response result, and
based on detecting that the history is extant, analyze the second response result to determine whether to execute the follow-up utterance processing on the second utterance.

11. The electronic device of claim 10, wherein determining whether to execute the follow-up processing is further based on a termination time of the session.

12. The electronic device of claim 9, wherein the first utterance is processed according to a first capsule in the session,
wherein the at least one processor is further configured to determine to execute the follow-up processing based on at least one of:

detecting a first situation including a recognition failure pertaining to processing of the second utterance, or detecting a second situation in which the second utterance is processed in a second capsule different from the first capsule in which the first utterance is processed.

13. The electronic device of claim 12, wherein the at least one processor is configured to:

based on determining to execute follow-up utterance processing for the second utterance, acquire a capsule identifier of the first capsule in which the first utterance is processed, wherein mapping the capsule for processing the second utterance includes designating the first capsule corresponding to the acquired capsule identifier for reprocessing of the second utterance.

14. The electronic device of claim 12, wherein:

when the first situation is detected, the third response result is generated via the follow-up utterance processing on the second utterance, and when the second situation is detected, the second response result is generated via root utterance processing on the second utterance, and the third response result is generated via follow-up utterance processing on the second utterance.

15. An operation method of an electronic device, the method comprising:

receiving via a microphone a first utterance, and processing via at least one processor the first utterance to initiate a session and generate a first response result;

after the session related to the first utterance is terminated, receiving a second utterance via the microphone;

processing the second utterance to generate a second response result;

based on the second response result, determining whether to execute follow-up utterance processing on the second utterance;

based on determining to execute the follow-up utterance processing, reprocessing the second utterance based at least in part on the first response result related to the first utterance to generate a third response result; and outputting via output circuitry the third response result.

\* \* \* \* \*